Jan. 16, 1934. W. D. FOSTER 1,943,303
PHOTOGRAPHIC APPARATUS
Filed Sept. 19, 1925 10 Sheets-Sheet 1

INVENTOR
Warren Dunham Foster,
by his atty
Byrnes, Stebbins & Parmelee

Jan. 16, 1934.  W. D. FOSTER  1,943,303
PHOTOGRAPHIC APPARATUS
Filed Sept. 19, 1925   10 Sheets-Sheet 2

Jan. 16, 1934.  W. D. FOSTER  1,943,303
PHOTOGRAPHIC APPARATUS
Filed Sept. 19, 1925  10 Sheets-Sheet 3

INVENTOR
Warren Dunham Foster
by his attys.
Byrnes, Stebbins & Parmelee

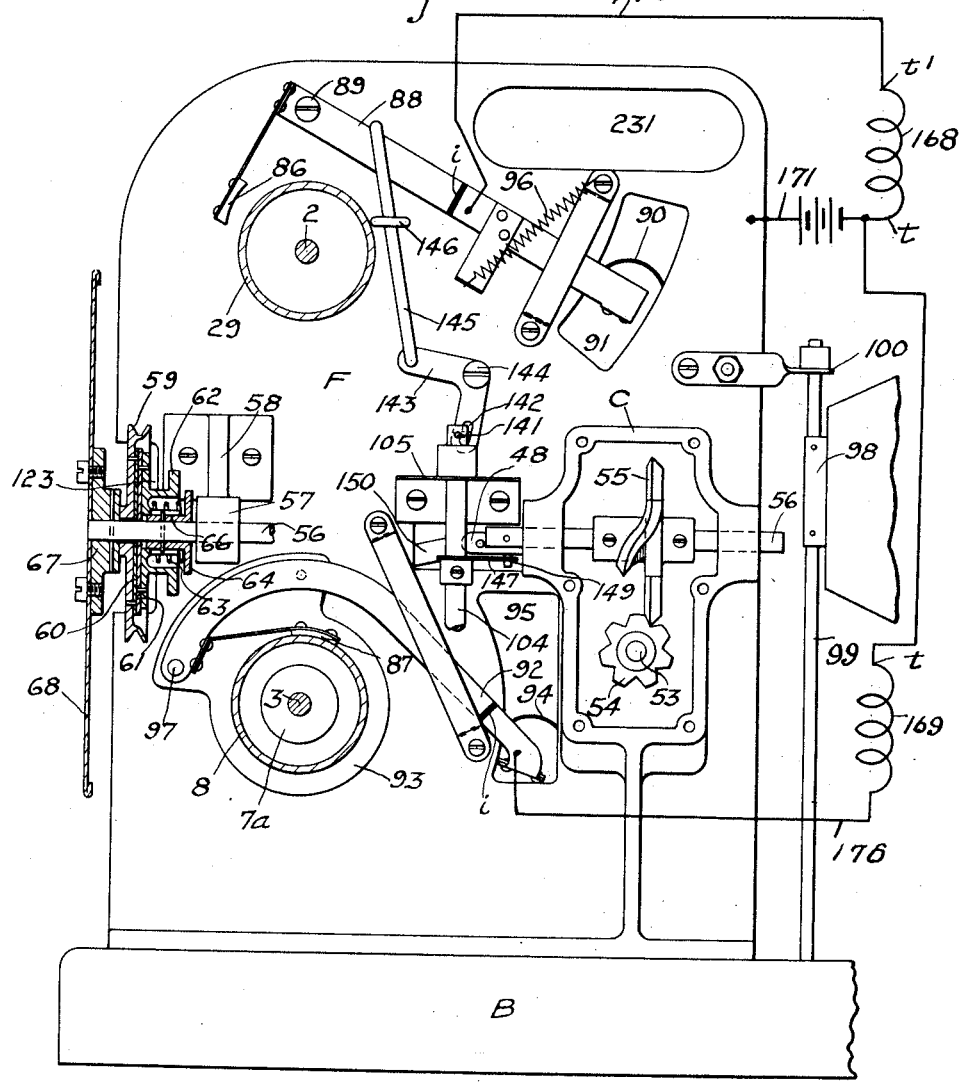

Jan. 16, 1934.  W. D. FOSTER  1,943,303
PHOTOGRAPHIC APPARATUS
Filed Sept. 19, 1925   10 Sheets-Sheet 5
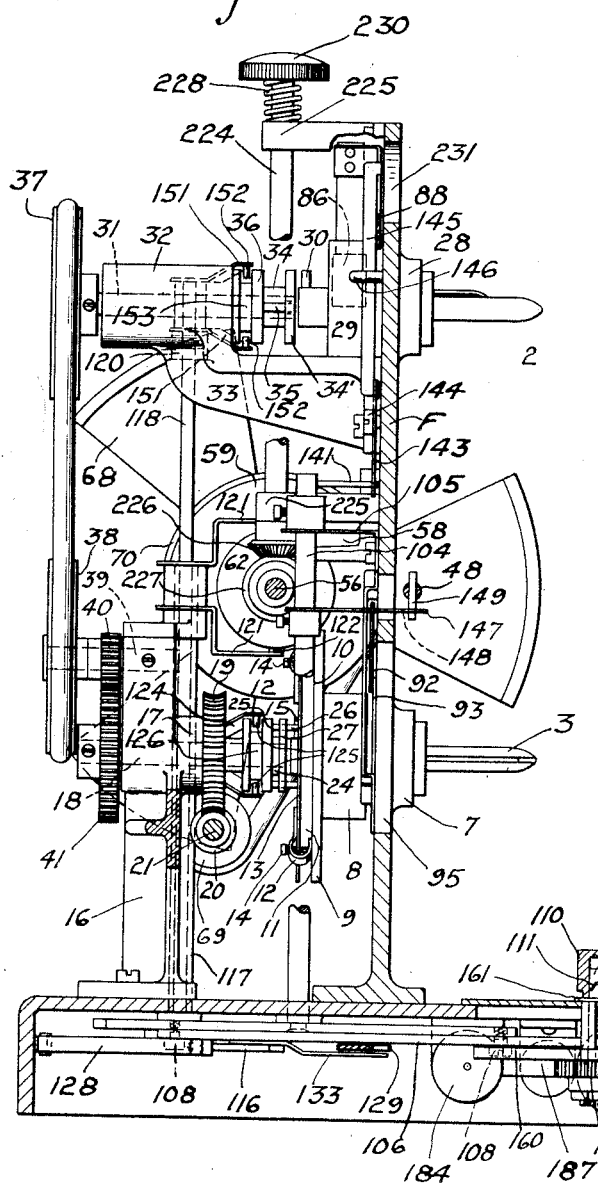
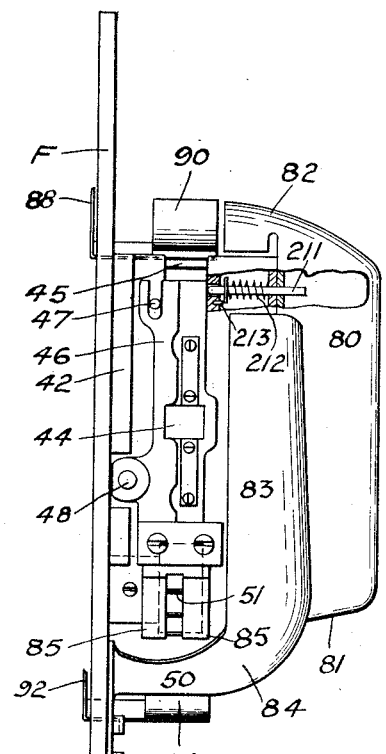
INVENTOR
Warren Dunham Foster
by his attys
Byrnes, Stebbins & Parmelee Jan. 16, 1934.                    W. D. FOSTER                    1,943,303
                              PHOTOGRAPHIC APPARATUS
                          Filed Sept. 19, 1925        10 Sheets-Sheet 6

INVENTOR
Warren Dunham Foster
by his attys
Byrnes, Stebbins & Parmelee

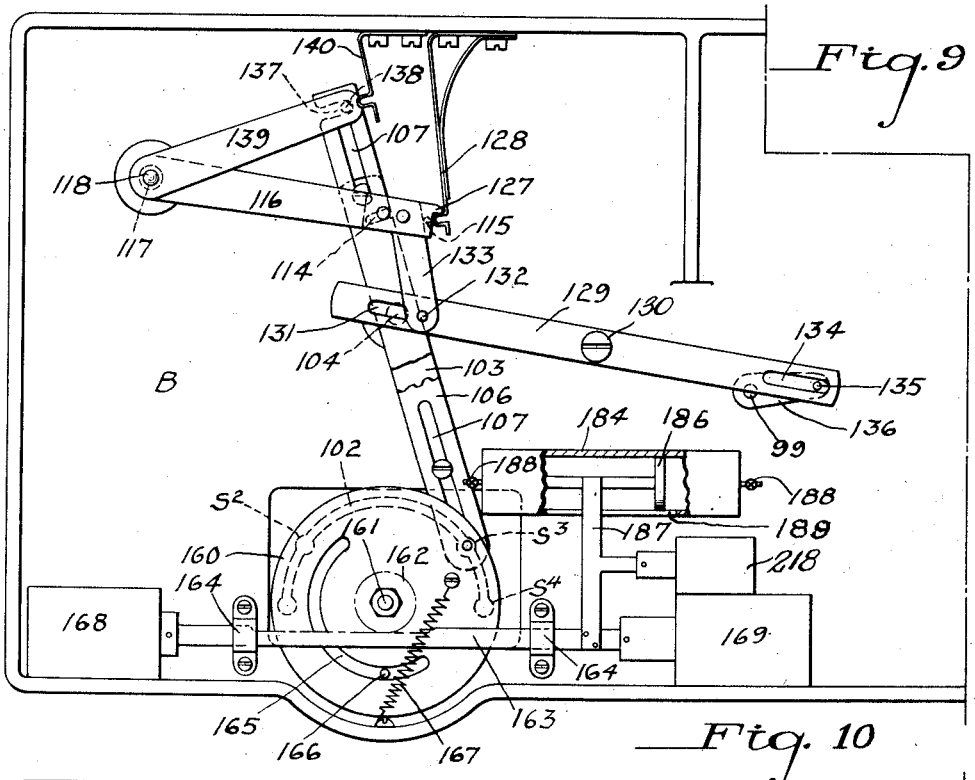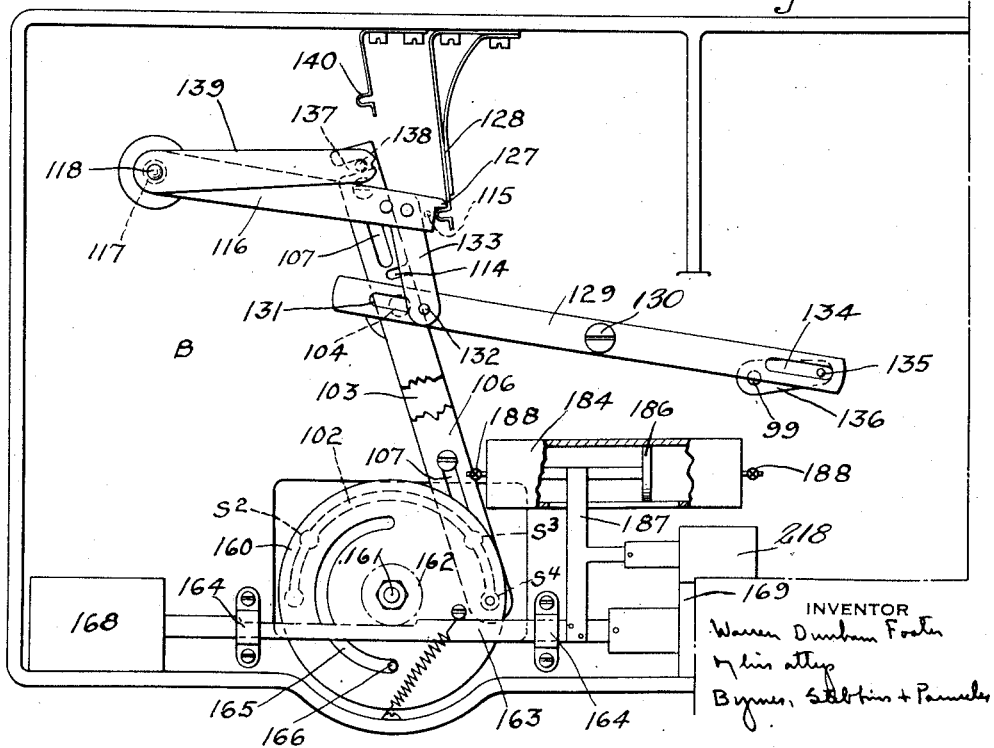

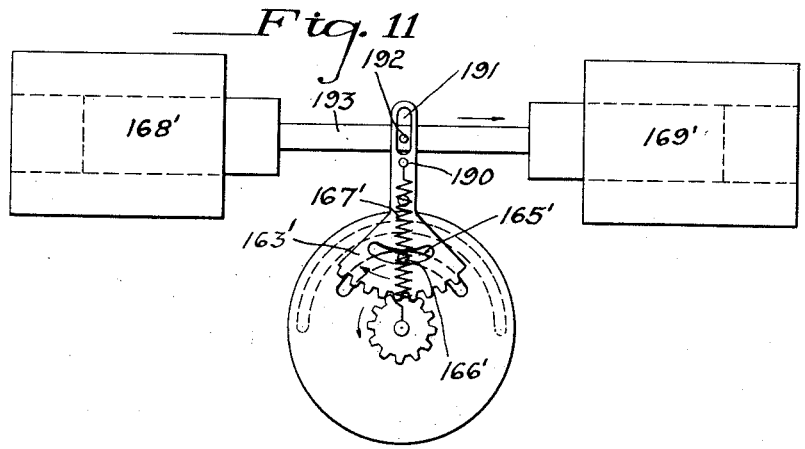
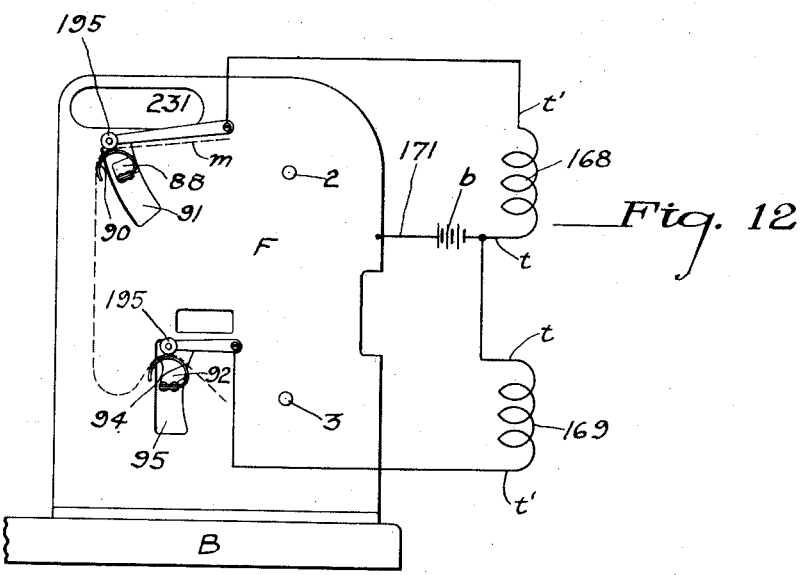
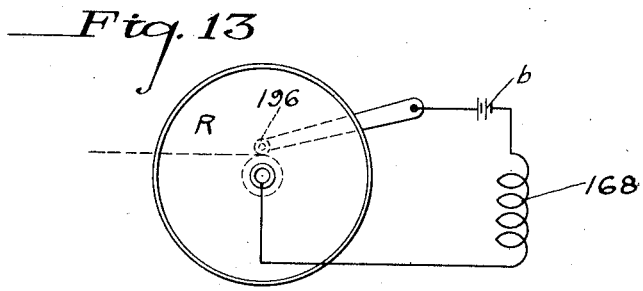

Jan. 16, 1934.  W. D. FOSTER  1,943,303
PHOTOGRAPHIC APPARATUS.
Filed Sept. 19, 1925   10 Sheets-Sheet 9
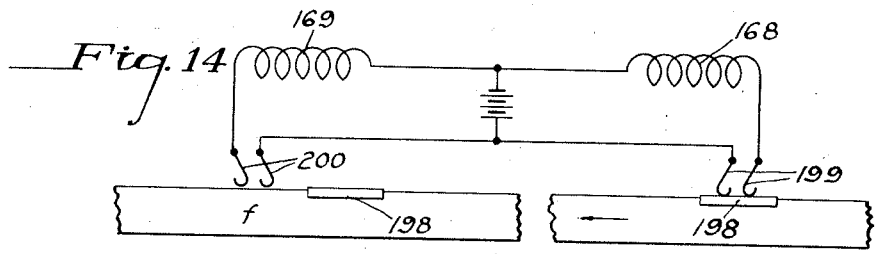
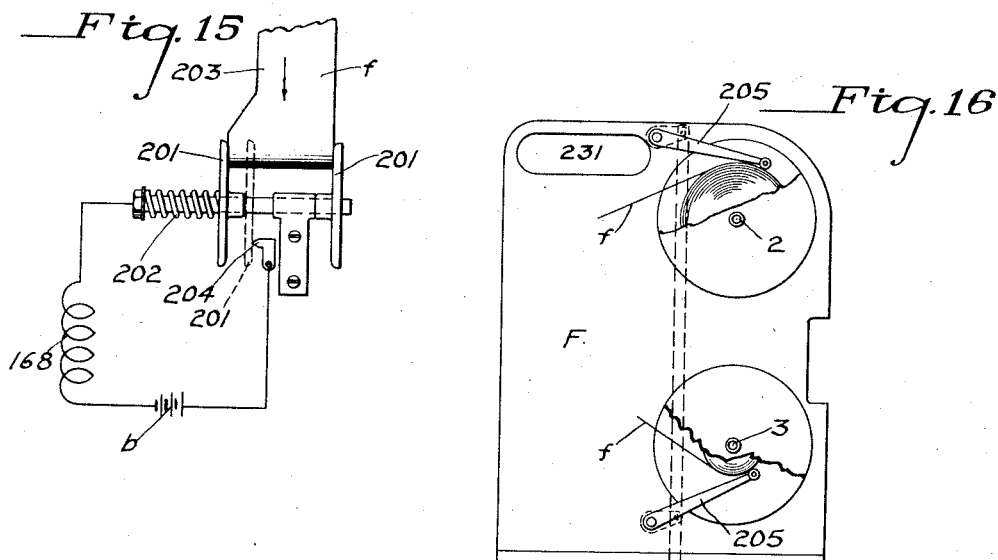
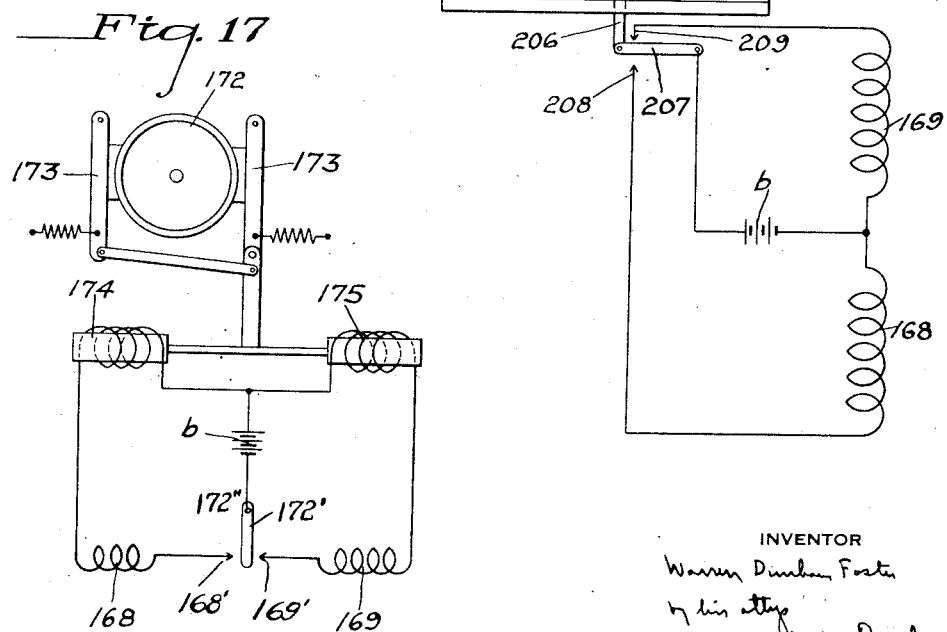
INVENTOR
Warren Dunham Foster
by his attys
Byrnes, Stebbins & Parmelee Jan. 16, 1934.    W. D. FOSTER    1,943,303
PHOTOGRAPHIC APPARATUS
Filed Sept. 19, 1925    10 Sheets-Sheet 10

INVENTOR
Warren Dunham Foster

Patented Jan. 16, 1934

1,943,303

UNITED STATES PATENT OFFICE 1,943,303

PHOTOGRAPHIC APPARATUS

Warren Dunham Foster, Washington Township, Bergen County, N. J., assignor to Kinatome Patents Corporation, New York, N. Y., a corporation of New York Application September 19, 1925
Serial No. 57,392

178 Claims. (Cl. 88—17)

The present invention relates broadly to photographic apparatus, and more particularly to apparatus of this character adapted for the projection of pictures in motion, such as required for advertising purposes, although the utility of the invention is not limited in this respect, it being equally well adapted for general use by unskilled operators for either projection of pictures in motion or still projection.

At the present time considerable attention is being devoted to the construction of apparatus capable of being utilized for the repetition display of motion pictures from a strip of film. By reason, however, of the fragile character of the film which must be used, and the difficulties of effecting reversal of its direction of travel, or rewinding of an exposed length, such apparatus has heretofore required not only a great deal of operating attention, but also frequent renewal of films or repair thereof.

Efforts have also been made to effect continuous film travel in the same direction by securing the ends of the film together, and providing some means for attempting to adequately take care of the main body of the film while the remaining comparatively short portion of the film has been passing through the gate. Considerable difficulty has, however, been experienced in this type of apparatus and its use has been necessarily limited.

This invention has for certain of its objects the provision of a control or reversing mechanism effective for the automatic rewinding of an exposed portion of film under such conditions as to minimize possibility of injury to the film, and correspondingly decrease the amount of operating attention required.

Other objects of the invention are to provide reversing or control mechanism of such character that a period of dwell can be effectively provided between the periods of normal feed as required for projection purposes and the rewinding. Preferably, this mechanism is such that the dwell can be variably timed in accordance with the type of film being handled, thereby enabling a time control which can always be made long enough to avoid undue strain on even the most delicate films. In actual practice it has been found that very narrow films, for example films having a width of only eleven millimeters, can be repeatedly shown well in excess of one thousand times, while the usual length of life of corresponding films with known apparatus has only been from two to three hundred cycles.

Another object of the invention is to provide reversing mechanism of such nature that the motor normally used for projection purposes is not subjected to any extra load during the reversing period, thereby enabling the use of a motor continuously operating in the same direction, and of minimum power and current consumption.

Still another object of the invention is to obtain reversal under such conditions that the film itself need not be subjected to any undue load or increased tension for reversal purposes.

A further object of the invention is to provide an improved form of film preferably having both of its ends secured to different carriers by means of lengths of fire resisting or fireproof material, such as asbestos, copper or the like. Such a construction not only prevents the possibility of injury to the film, but also provides a convenient means for controlling the operation of the projecting apparatus, although the present invention contemplates various forms of control as will be hereinafter more fully apparent.

Also, the invention has for one of its objects a form of controlling mechanism of such nature that at desired or predetermined intervals the type of projection may be changed from projection in motion to so-called still or stereopticon projection. This may be particularly desirable, for example, in displaying titles, legends or the like. In this manner the film stock is materially conserved, as the lengths ordinarily devoted to title space may be diminished, it being only necessary to have the desired title or legend appear on a comparatively few frames, and then utilize one of these frames for the desired still projection.

A still further object of the invention is to provide a control which may be so operated as to diminish the speed of the feeding mechanism during the periods of stripping the film therefrom or of engaging the film, thereby protecting the film during such times as it has heretofore been subjected to the hardest usage or wear.

Another object of the present invention is to provide automatically operable means for slowing down the continuously operating driving mechanism of the apparatus just before any of the clutches are operated to connect or disconnect any of the operable parts to the driving mechanism. Such means are very advantageous for reducing the shock and strain on the apparatus and the film which would otherwise occur if the operable parts were suddenly connected to a rapidly moving driving mechanism.

In so-called "still" or stereopticon projection, it is essential to stop the shutter so that the opening therethrough coincides with the optical axis of the apparatus. Heretofore, in film handling apparatus which discloses means for predeterminedly stopping the shutter, the latter has been so connected with the other moving parts of the apparatus that upon stopping the rapidly moving shutter and the moving parts connected thereto, a severe shock and strain was brought upon the shutter and intermittent sprocket, both of which are relatively delicate and expensive parts of the apparatus, by the momentum of such heavy parts as the take-up reel and the film supported thereon. To remove such undesirable conditions attendant upon the stopping of the shutter, a further object of this invention is to provide means for predeterminedly stopping the shutter and the intermittent sprocket for showing "stills" with a minimum of strain upon these parts. This result is accomplished according to my invention by providing means automatically operative for disconnecting the shutter and the intermittent sprocket from the other moving parts of the apparatus just before applying means to the shutter for predeterminedly stopping it.

The invention is herein illustrated as applied to an apparatus of the general character shown and claimed in the application of Barton A. Proctor, Serial No. 54,910, filed September 8, 1925, although it will be understood that the invention is not limited to use with any particular form of projector.

Other objects and advantages of the present invention will be apparent from the following specification and drawings constituting a part thereof, the drawings being for purposes of illustration only of certain preferred embodiments of my invention, in which changes with respect both to operation and construction may be made without departing either from the spirit of my invention or scope of my broader claims.

In the drawings:

Figure 4 is a partial left side elevation broken away to show actuating parts in film threading position;

Figure 5 is a cross section on the line V—V of Figure 2 looking in the direction of the arrows;

Figure 6 is a partial view taken on the line VI—VI of Figure 1 showing the right side only to illustrate a portion of the gate;

Figure 9 is a partial bottom plan view showing actuating levers in "film threading or changing" position;

Figure 10 is a partial bottom plan view showing actuating levers in "rewind" position;

Figure 11 is a diagrammatic view illustrating a modified form of actuating mechanism;

Figure 12 is a view largely diagrammatic and illustrating a slightly modified form of circuit for the actuating mechanism;

Figure 13 is a view similar to Figure 12 and showing still another form of circuit control;

Figures 14 and 15 are views similar to Figure 12 and showing constructions in which the edges of the film control the actuating mechanism;

Figure 16 is a view similar to Figure 12 illustrating a control obtained by means of the diameter of the film on its respective carriers;

Figure 17 is a diagrammatic view illustrating one form of control in which the speed of the feeding mechanism is automatically reduced by means of a brake;

Figure 1:
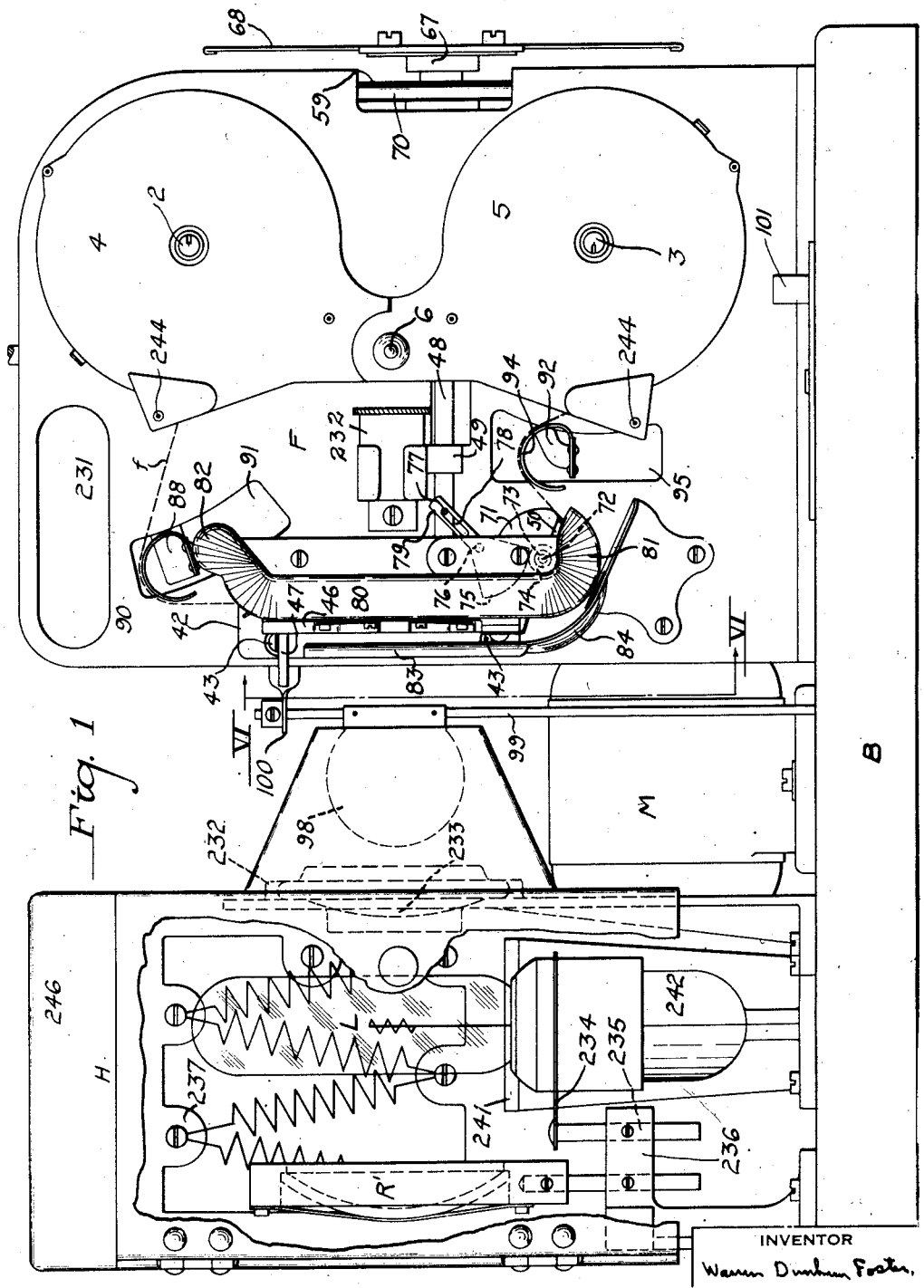
Figure 1 is a right side elevation of the machine, certain parts of the lamp housing being broken away.

Certain of the features of the present invention, and more particularly those with respect to the automatic means for maintaining the desired tension on the film are shown and claimed in the copending application of Clarkson W. Bundick and Barton A. Proctor, Serial No. 44,482, filed July 18, 1925.

In carrying out the present invention there may be provided an apparatus comprising a supporting base B having mounted thereon a lamp and resistance containing housing H and a supporting frame F upon which are mounted the operating parts of the film feeding and controlling mechanism per se.

Preferably carried by the frame F and projecting laterally from one side thereof in predetermined spaced relationship is a pair of reel receiving spindles 2 and 3, the upper spindle 2 being adapted for the holding of a reel of film during the feeding movement thereof and adapted to effect rewinding of the film at the conclusion of the feeding movement, while the lower spindle 3 is adapted to be positively driven simultaneously with the feeding movement for coiling or taking up the film as required.

The film itself is preferably carried in a combined storage and exhibiting protector comprising a pair of containers 4 and 5 having a pivotal connection 6 whereby the containers may be relatively separated to a predetermined extent to expose the desired length of film therebetween. This construction may be substantially as disclosed and claimed in the United States Patent No. 1,440,173, granted December 26, 1922, to Herbert George Ponting and George William Ford, or may be of any other desired construction.

The lower spindle 3, which will hereafter be referred to as the driving spindle, is journaled for rotation in a suitable bearing 7 in the frame F. The back of the frame is formed with an enlarged boss 7ª through which the spindle extends, and beyond the boss there is secured to the spindle a combined brake drum 8 and friction driving member 9. The driving member 9 has a friction surface 10 with which is adapted to cooperate a second friction member 11 in the form of a disk. The disk 11 and the driving member 9 are preferably held in frictional engagement by means of springs 12 carried by the member 9 and bearing against the disk 11 through the medium of an annulus 13, the springs being held under the desired tension and the annulus being maintained in position by adjusting screws 14.

Projecting rearwardly from the disk 11 is a driving lug 15 adapted to be engaged by a clutch hereinafter described in detail by means of which the driving spindle 3 may be frictionally rotated.

Projecting upwardly from the base B in spaced relation to the frame F is a bearing bracket 16 carrying a bearing 17 for a shaft 18 extending in alignment with the driving spindle 3. Secured in any desired manner to the shaft 18 for rotation therewith is a worm wheel 19 adapted to be driven by a worm 20 secured to a horizontally positioned driving shaft 21 located in the rear of the frame F. This shaft at its forward end is mounted in spaced bearings 22 carried by the bracket 16 and is connected to a driving motor M through a flexible coupling 23 of any desired or usual construction. By reason of this mechanism, it will be apparent that when the motor M is operated the shaft 18 will be positively driven through the worm and wheel before referred to. For transmitting this rotational movement from the shaft 18 to the spindle 3 at will there is provided a sleeve 24 secured in any desired manner to the inner end of the shaft 18 and having slidably mounted thereon a collar 25 from which project pins 26 slidable through the enlarged end 27 of the sleeve 24. By moving the collar 25 to the right as viewed in Figure 5, the pins 26 are projected into the path of travel of the driving lug 15 whereby a drive is positively transmitted to the driving spindle. This clutch will hereinafter be referred to as the driving spindle clutch.

The spindle 2, which will hereinafter be designated the rewinding spindle, is mounted similarly to the driving spindle 3 in a bearing 28 carried by the frame F, and has secured to its rear end a brake drum 29 from which projects a pin or lug 30. Extending in alignment with the rewinding spindle 2 is a shaft 31 suitably journaled in a bearing 32 carried by a bracket 33 illustrated as secured to the frame F. Mounted on the inner end of the shaft 31 is a sleeve 34 having an enlarged end 34' through which project pins 35 carried by a collar 36 and constituting a rewinding clutch similar in construction and operation to the construction of the driving spindle clutch. Upon movement of the collar 36 to the right as viewed in Figure 5, the pins 35 will be brought into the path of travel of the pin or lug 30 whereby the rewinding spindle 2 may be operated for effecting a rewinding of a previously displayed length of film.

For driving the shaft 31, it may conveniently have secured thereto a pulley 37 in line with a similar pulley 38 mounted on the outer end of a stub shaft 39 secured in the bracket 16. Also mounted on the shaft 39 is a spur gear 40 adapted to be driven by a similar, but preferably larger gear 41 on the outer end of the shaft 18. By passing a suitable belt around the pulleys 37 and 38 it will be apparent that the shafts 18 and 31 may be simultaneously rotated by the motor M, the shaft 31 preferably rotating at a higher speed than the shaft 18, and that rotative movement in turn may be imparted by either of these shafts to the respective spindles with which they are in alignment by suitable operation of the controlling clutches.

Mounted on the frame F adjacent the motor M and preferably on the front side of the frame is a gate section 42 preferably secured in any desired manner as by screws 43 against movement relatively to the frame. This section is preferably formed with an aperture 44 through which light may be projected as well understood in the art, and with a film guiding depression 45 extending lengthwise of the section, and intersecting the opening 44, for the travel of the film. Cooperating with the section 42 is a relatively movable section 46 preferably guided by a pin 47 projecting outwardly from the section 42, and secured to one end of a gate opening rod 48 slidable through a suitable opening in the gate section 42 and a suitable bearing 49 on the frame F. By reason of this construction, it will be apparent that when the rod 48 is moved to the left as viewed in Figure 1, it will be effective for moving the section 46 away from the section 42 to permit the removal of a film and the insertion of a new film, while movement in the opposite direction will bring the sections into cooperative relationship.

Figure 22:
Figure 22 is a detail view of one form of film.

For effecting the desired intermittent feeding motion of a film in position in the gate, there may be provided a feeding sprocket 50 having film engaging teeth 51 adapted to engage apertures 52 substantially centrally positioned in the film $f$, as shown, for example, in Figure 22. This sprocket is mounted on a shaft 53 extending transversely through the frame F and carrying at its opposite end a star wheel 54. This star wheel, which may be of any well known construction, is adapted to be intermittently driven by means of a cam 55 secured adjacent one end of a shutter shaft 56 journaled at one end in a grease casing C within which are mounted the cam 55 and star wheel 54, and at its opposite end journaled in a suitable bearing 57 carried by a bracket 58 projecting rearwardly from the frame F.

Mounted loosely on the shaft 56 adjacent the opposite end thereof is a pulley 59 adapted to be rendered operative at will by a clutch collar 62. The clutch collar is normally urged in such direction as to be in frictional driving engagement with the pulley 59 by means of a spring 63 abutting at one end against the bottom of a spring receiving recess formed in the collar and at the other end against a shoulder 64 on a spring sleeve 66 secured in any desired manner to the shaft 56 for rotation therewith. Secured to the shaft 56 outside of the pulley 59 is a hub 67 carrying a shutter 68 for operation as well understood in the art. The hub 67 and the shoulder 64 take all of the thrust exerted by the spring 63 whereby the shaft 56 as a whole is relieved from any end thrust.

Secured to the end of the driving shaft 21, and preferably substantially in line with the pulley 59 is a pulley 69 around which may pass a belt 70 for driving the pulley 59 from the drive shaft. By reason of this construction, it will be apparent that with the collar and pulley in frictional engagement rotation will be imparted to the shutter shaft 56 from the driving shaft 21, this rotation being effective not only for operating the shutter but also for obtaining the desired intermittent operation of the film feeding sprocket.

Cooperating with the sprocket 50 and normally occupying the position illustrated in Figure 1 of the drawings, is a stripping shield 71 carried by the inner end of a pin 72 supported in a suitable manner by a bearing 73 constituting part of the fixed gate section 42. Also secured to the shaft 72 is a pinion 74 with which meshes an arcuate rack 75 having a pivotal mounting 76 and operated simultaneously with the operation of the gate rod 48 by means of a pin 77 projecting outwardly from the gate opening rod and engaging a slot 78 in the extension 79 of the arcuate rack. With the construction just described, movement of the gate opening rod to the left as viewed in Figure 1 for the purpose of opening the relatively separable gate sections, will effect rotation of the rack in a counter-clockwise direction as viewed in this figure, thereby rotating the shield in a clockwise direction. This rotational movement of the shield will be effective for engaging the film f and stripping the same from the sprocket preparatory to the removal of the film from the apparatus. It will remain in this position covering certain of the teeth of the sprocket during the application of a new film or during rewinding, whereby the threading operation of the film is greatly expedited or the film protected during rewinding.

For further assisting the threading movement, the relatively fixed gate section 42 is provided with a projecting guide 80 having a generally curved contour for gradually feeding the film over the fixed gate section, the guide having a downwardly curved and inclined lower end 81 for insuring passage of the film over the sprocket and an upwardly inclined and curved upper end 82 for the purpose hereinafter more fully set forth. The frame F also has secured thereto a secondary guide member 83 positioned in spaced relation to the guiding member 80 and adapted to extend substantially in alignment with the inner face of the movable gate section when it has been moved to open position, whereby the film is effectively guided into position between these gate sections. The member 83 has a curved lower end 84 having a function corresponding to that of the curved end 82 of the guide member 80, and described in detail hereinafter. Projecting downwardly from the lower end of the movable gate section is a pair of spaced guide fingers 85 curved to generally conform to the curvature of the sprocket 50, the space between these fingers being sufficient to accommodate the teeth 51 of the sprocket. These guides cooperate in a manner, as will be readily apparent from the drawings, to permit a film to be positioned between the gate members by merely moving the same laterally relative to its normal direction of travel through the gate. This greatly lessens the time required for threading new film into position, and enables the operation to be performed satisfactorily by an unskilled operator.

In order to entirely obviate the necessity of manually producing slack or loops as heretofore required, there is provided a tension control means of the general character set forth in the application before referred to. This tension control preferably comprises braking means automatically operated by the film, and comprising an upper brake 86 cooperating with the brake drum 29 on the rewinding spindle 2 and a lower brake 87 cooperating with the brake drum 8 on the driving spindle 3. The upper brake 86 is carried by a brake lever 88 having a pivotal mounting 89 on the frame F at the rear thereof and having secured to its opposite end a film guide 90 projecting forwardly through a suitable opening 91 in the frame F. The lower brake 87 is in turn preferably carried by a curved lever 92 secured to a plate 93 loosely surrounding the boss 7ª on the frame F whereby the plate as a unit may be rotated around this boss. At its opposite end the curved lever 92 is provided with a film guide 94 projecting forwardly through a suitable opening 95 in the frame F. During the feeding of a film through the apparatus all of the parts occupy the position illustrated in Figure 1 while during the threading of a film into position or the removal of a film from the apparatus, the parts occupy the position illustrated in Figure 3. In this latter position it will be noted that the guide 94 occupies such a position with respect to the curved lower end 84 of the guide member 83 as to insure the passage of a film upwardly around the guide 94 automatically upon lateral movement of the film, while the guide 90 occupies such a position with respect to the upwardly inclined curved upper end 82 of the guide member 80 as to insure passage of a film over and around the guide 90 by the operation referred to. The lever 88 is normally swung in such direction as to cause the brake 86 to contact with the drum 29 by means of a spring 96. Due to the action of this spring, the brake 86 normally tends to prevent too free rotation of the rewinding shaft and thereby prevents the formation of an undue amount of slack. In the event, however, of not sufficient slack, the tension on the film causes the lever 88 to move in opposition to the action of the spring 96, thereby relieving the braking action of the brake 86 to a corresponding extent and again producing the desired amount of operating slack or loop with a resultant desired tension on the film.

The lower brake 87, on the other hand, is normally so positioned as to exert no appreciable braking action on the drum 8. In the event, however, of undue tension on the film between the feeding sprocket 50 and the reel carried by the driving spindle 3, the film will be effective for swinging the lever 92 in such direction about its pivotal mounting 97 on the plate 93 as to bring the brake 87 into more effective braking engagement with the drum 8. Due to the fact that the spindle 3 is driven from the motor through a friction drive, this braking action will be effective for decreasing the driving force on the spindle 3, and consequently will relieve the tension on the film and produce the desired operating conditions between the sprocket and the lower reel. In this manner the required tension on the film with the requisite amount of slack or loop to insure proper feeding is automatically produced by the mere threading of the film into position and is automatically maintained by the operation of the tension or braking mechanism.

In order to make it unnecessary to utilize any considerable portion of the film for titles or legends, which are obviously adapted for so-called still projection, the apparatus is adapted to periodically occupy a position in which this still projection can be obtained. Preferably, the film will be of such construction, as will hereinafter be described in detail, as to automatically control the change in operating conditions of the apparatus to effect projection in motion, or still projection, the interval of time devoted to the actual still projection being entirely automatically produced, preferably by the film and mechanism controlled thereby.

When the apparatus is utilized for this so-called "still" projection of pictures, titles or legends, it is necessary to provide means in the path of travel of the light rays for protecting the film against danger of injury by reason of undue temperature conditions. For effectively shielding the film during such period, there is provided a trap or shield 98 carried by a shaft 99 having its upper end journaled in a bearing 100 projecting from the frame F and having its lower end suitably journaled in the supporting base B. This shaft is adapted to be periodically and intermittently operated in accordance with the character of operation of the machine for bringing the shield positively into position when the apparatus is operating for the still projection of pictures and to throw it out of position for the projection of pictures in motion.

While the present apparatus is not necessarily limited to any particular field of use, it is primarily intended either for use in advertising for the successive showing of a length of film or for use by persons who may be unskilled in the art. With this dual purpose in view, it is desirable not only to provide for automatic control, but also to simplify the control to as great an extent as possible not only for the purpose of rendering the operation easier, but for the purpose of making such operation foolproof. For this purpose there is preferably provided a single control member in the form of a knob or button 101 projecting upwardly through an arcuate slot 102 in the supporting base B. This slot may be so shaped as to provide four operating stations designated, respectively, S1, S2, S3 and S4. The button 101 is adapted to be moved at will either manually so as to occupy any one of these stations, or automatically so as to occupy any of stations S1, S2 or S4. With this button at the station S1, the respective parts of the apparatus are in such position as to insure the normal projection of pictures as usual motion pictures. With the control button at station S2, there is obtained a so-called still or stereopticon projection, the movement of the button from the station S1 to the station S2 being effective for disengaging the respective driving mechanisms which are in operation during the projection of pictures in motion. With the button in position at station S3, the respective parts of the apparatus are in such position as to permit the positioning of a film therein or the removal of a film which has just been fed therethrough. It will be understood that the movement of the button from station S2 to station S3 automatically produces the required change in the operating position of the parts. With the button in position at station S4, the respective parts of the apparatus are in such position as to permit rewinding of the film by means of the motor M. The movement of the button from station S3 to station S4 automatically produces the required change in operating conditions necessary for such rewinding. This provision of a single control member movable only in a predetermined manner and automatically effective upon movement for producing all of the necessary changes in operating conditions constitutes an important feature of the present invention, as it renders the control and operation of the apparatus extremely simple and substantially foolproof.

The control mechanism actuated either manually by the control knob or automatically as hereinafter set forth in detail, is to a large extent shown in Figures 7, 8, 9 and 10, inclusive, which illustrate in succession the change in the position of the parts of the control mechanism by movement of the control button successively to the respective stations. This mechanism may comprise a lever 103 keyed or otherwise secured to the lower end of a brake release rod 104 having its lower end journaled in any desired manner in the base B and its upper end journaled in a bearing bracket 105. Being secured to the brake release rod 104 which is capable only of a turning movement about its longitudinal axis, the lever 103 is restricted in its movements to rotation only. Carried by the rotating lever 103 is a combined sliding and rotating lever 106 having adjacent each end a slot 107 through each of which projects a headed pin 108 by means of which the combined sliding and rotating lever is effectively mounted on the rotating lever for rotational movement simultaneously therewith and sliding movement independently thereof. At its front end the lever 106 carries an upstanding pin 109 having a head 110 provided with an inwardly projecting pin 110' adapted to engage a bayonet shaped slot 111 in the pin 109. By reason of this construction it will be apparent that the button may be moved vertically on the pin 109 by a rotative movement thereof so that it may either occupy an upper or a lower position on the pin. At its lower end the button has a collar 113 of a diameter to substantially conform to the contour of the slot 102 at the respective operating stations, whereby with the button in its lower position accidental movement from one of these stations is prevented, while with the button in its upper position the parts are free for automatic operation independently of any operator.

At a point intermediate its length the combined rotating and sliding lever 106 is provided with a transversely extending recess 114 adapted to cooperate with a pin 115 projecting upwardly from a lever 116 which is secured adjacent one end on a control sleeve 117 surrounding a control rod 118, the sleeve and rod extending upwardly through the base B and journaled for rotational movement in bearings 119 carried by the bracket 16 and by an upper bearing 120 carried by the bracket 33. Adjacent its upper end the control sleeve 117 has projecting therefrom forked operating arms 121 carrying projecting pins 122 adapted to normally lie in the groove 123 of the clutch member 62 on the shutter shaft 56. By reason of this construction it will be apparent that upon rotation of the sleeve 117 in a counter-clockwise direction, as viewed in Figure 7, the clutch members 60 and 61 will be disengaged, thereby destroying the driving relationship between the main drive shaft 21 and the shutter shaft 56.

At an intermediate point the control sleeve is also provided with a similar pair of arms 124 having pins 125 normally projecting into the groove 126 of the clutch collar 25. Rotation of the sleeve in a counter-clockwise direction as just described will be effective through the arms 124 for disengaging the driving spindle clutch to thereby permit the driving spindle to move freely in either direction. Engagement of the driving spindle clutch and the shutter shaft clutch will be effective for the so-called projection of pictures in motion but this engagement is not required for still or stereopticon results. This operation of the sleeve 117 is obtained by moving the control button from station S1 to station S2, or from the position shown in Figure 7 to the position shown in Figure 8, by reason of the relative movement imparted to the sleeve due to the sliding action of the lever 106. This movement will also be effective for bringing the projection 127 on the lever 116 into holding engagement with the detent spring 128 whereby the sleeve will be held in the position to which its has just been moved until such time as the control button is manually moved from station S2 to station S1.

In changing from the normal projection to the projection of still pictures, it is also necessary to move the shield or screen 98 into position. This is positively accomplished simultaneously or in timed relation with the rotation of the sleeve 117, through the medium of a lever 129 pivoted at its intermediate portion on a stud pivot 130 secured in the base B. At one end the lever 129 has a slot 131 within which projects a pin 132 on an extension 133 projecting from the lever 116. At its opposite end the lever 129 has a slot 134 in which projects a pin 135 extending downwardly from a crank arm 136 on the lower end of the shaft 99. Through the medium of the mechanism just described the movement of the lever 106 will rotate the lever 129 in such direction as to swing the light shield into light intercepting position. It will be noted that this movement of the light shield takes place positively in timed relation to the movement of the operating parts necessary in obtaining still projection, and thereby eliminates any possibility of injury to a film while stationary.

It may be assumed that after the single projection of a film, or the repeated projection thereof, it is desired to change the same, or that in starting it may be necessary to move the parts of the apparatus into such position that a film may be threaded into position therein. Under such circumstances the control button wil be moved from station S2 to station S3. This movement will be effective only for rotating the brake release rod 104 and for bringing a recess 137 in the lever 106 into cooperative engagement with a pin 138 projecting upwardly from a lever 139 secured to the lower end of the control rod 118. The lever 139 is normally held in the position illustrated in Figures 7, 8 and 9 by means of a detent spring 140 cooperating therewith, as clearly illustrated in the drawings. The rotation of the brake release rod is effective for opening the gate sections of the gate, for moving the brakes 86 and 87 and their associated parts to inoperative position and for so actuating the stripper shield 71 as to effect the desired stripping movement of a film from the sprocket 50 or the shielding of the sprocket to permit the threading of a new film into position. These operations are obtained by securing to the upper end of the brake release rod a pin 141 extending into a slot 142 in one arm of a bellcrank lever 143 having a pivotal mounting 144 on the back of the frame F. The opposite arm of the bell crank lever is in cooperative engagement with one end of a link 145 movable through a slide or guide 146 and having its upper end bent inwardly to extend over the brake lever 88. Movement of the control button from the station S2 to the station S3 will be effective for rotating the brake release rod 104 in a clockwise direction, as viewed in Figure 9, thereby rotating the bell crank lever 143 in a counter-clockwise direction, as viewed in Figure 4, and consequently rotating the brake lever 88 about its pivotal mounting 89 in opposition to the spring 96 for moving the brake 86 to inoperative position.

Figure 3:
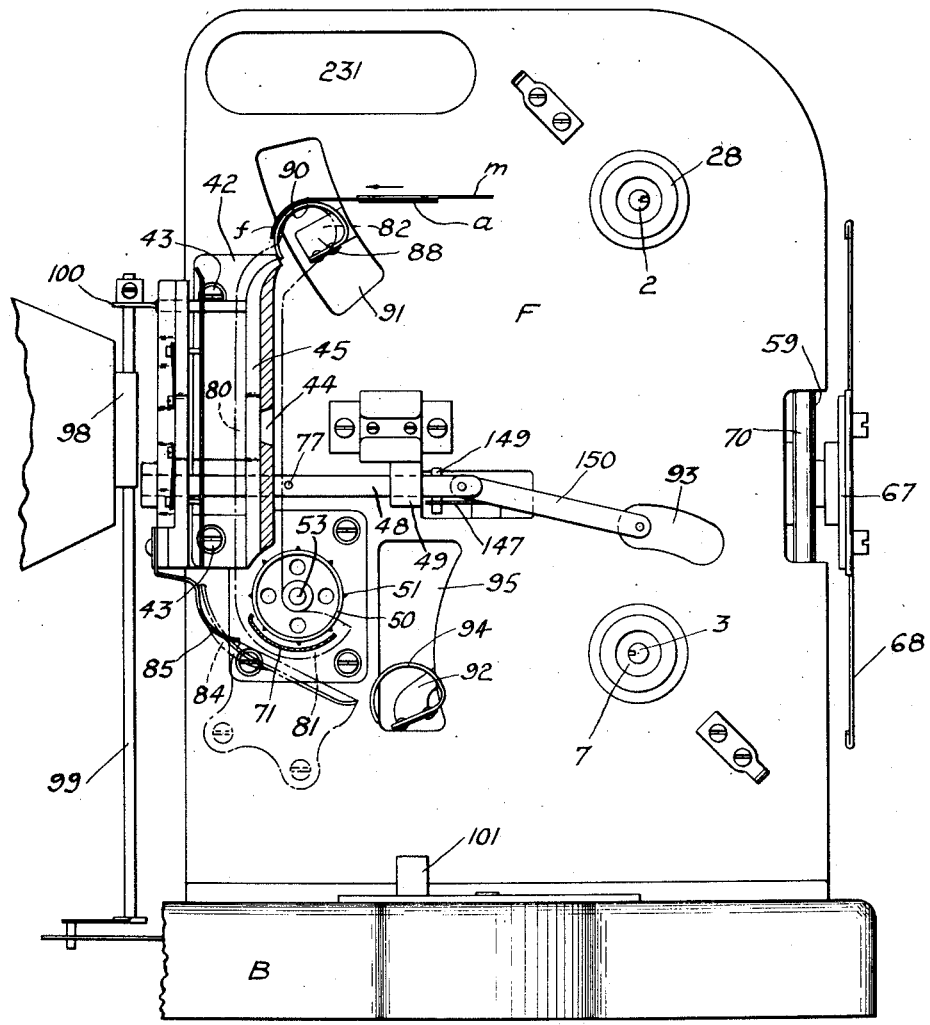
Figure 3 is a partial right side elevation broken away to show actuating parts in film threading position.
Figure 7:
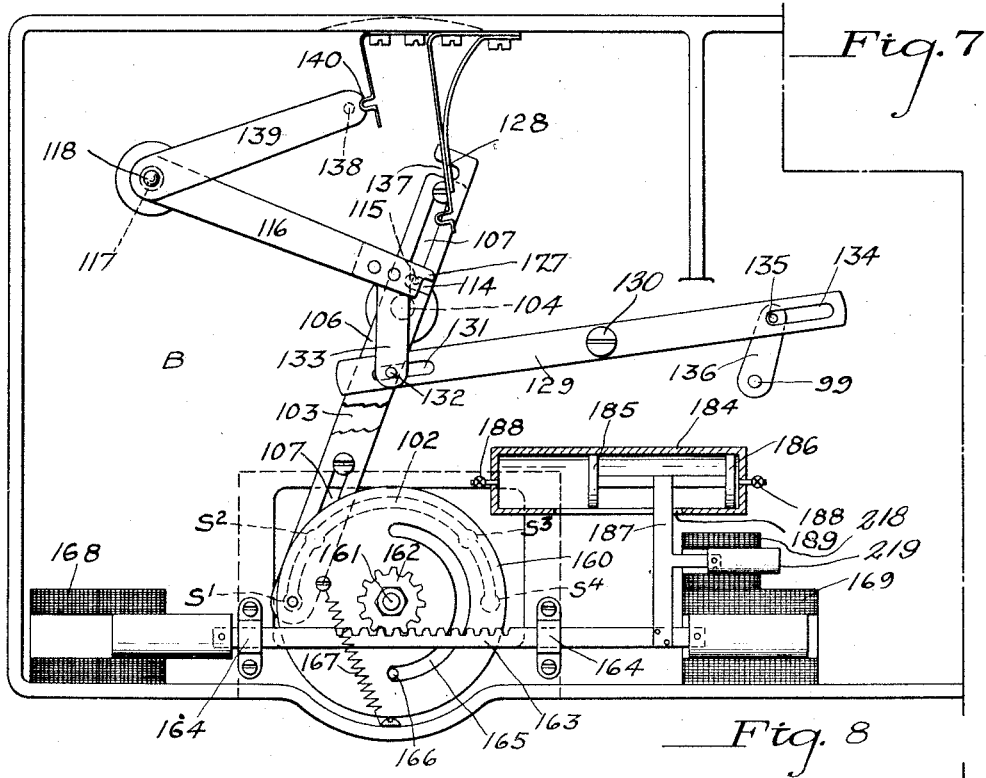
Figure 7 is a partial bottom plan view showing actuating levers in "normal intermittent projection" position.
Figure 8:
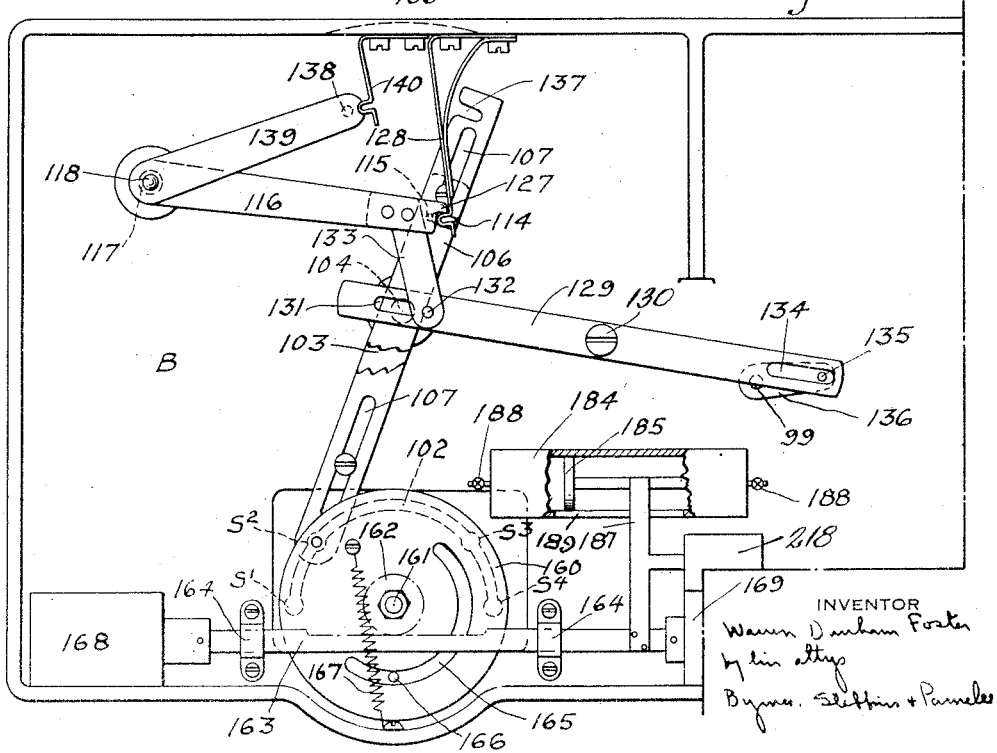
Figure 8 is a partial bottom plan view showing actuating levers in "still projection" position.

Movement of the lower brake is obtained simultaneously with actuation of the upper brake through the medium of a crank lever 147 secured at an intermediate point to the brake release rod. This crank lever has a slot 148 in its free end into which projects a downwardly extending pin 149 carried by the gate control rod 48. The right hand end of the gate control rod as viewed in Figures 3 is connected by a link 150 with the brake lever 92, whereby said brake lever and the gate control rod operate in unison. Movement of the brake release rod occasioned by operation of the control button from station S2 to station S3 is effective for rotating the plate 93 and all parts carried thereby in such direction as to lower the film guide 94 in the slot 95 and bring it into such cooperative relation to the guides 80 and 83 as shown in Figure 3 as to facilitate the removal of a film or the positioning of another film. This movement of the gate control rod will also tend to separate the gate sections and will move the shield 71 into stripping and shielding position, as will be obvious.

If it is not desired to change a film, as would be the case in advertising for example, the control button may be moved from station S3 to station S4, or may be moved from station S2 to station S4 without stopping at station S3. This movement will be effective by reason of the engagement between the recess 137 and the pin 138 for rotating the control rod 118. At its upper end this control rod carries spaced arms 151 similar to the arms 117 and 124 previously described and provided with pins 152 normally lying in the groove 153 in the rewinding clutch collar 36. The rotation of the control rod 118 as occasioned by the movement of the control button from station S3 to station S4 will be such as to move the rewinding clutch into operative position, whereby the spindle 2 is connected in driving engagement with the shaft 31, this engagement being such that the film may be rewound by the continued operation of the motor M.

From the foregoing it will be apparent that the operation of a single control button performs in succession the necessary changes in the operating positions of the various parts for permitting any desired condition of operation of the apparatus. Upon movement of the control button from station S4 to station S3 the rewinding clutch will be disengaged and the lever 139 moved into cooperative engagement with the detent 140. Upon movement from the station S3 to the station S2, the recess 137 will leave the pin 138 and the brake release rod 104 will be rotated in the opposite direction to that heretofore described. Upon movement of the button from station S2 to station S1, the lever 116 will be disengaged from the detent 128 and its movement will effect reengagement of the shutter clutch and of the driving spindle clutch. At the same time, lever 129 will be restored to its original position, thereby effecting movement of the light shield to inoperative position.

Reference has heretofore been made to the adaptability of the apparatus to advertising or other purposes wherein repetitive showing of the film is desirable, and wherein for practical reasons it is not feasible to have an operator in constant attendance. In such cases the movement of the control parts may be automatically obtained merely by moving the control button 101 to its upper position on the pin 109 as before described. When in this position there will be no holding or locking effected by the button, so that all of the parts are free for automatic operation. Mechanism for this purpose is shown in Figures 7, 8, 9, 10 and 11, while modified forms of control for this purpose are illustrated in Figures 12, 13, 14, 15, 16 and 19.

As shown in Figures 7 to 10, both inclusive, one form of mechanism may comprise a disk 160 having a pivotal or rotative support 161 on the base B. This disk has secured thereto the pin 109 whereby rotation of the disk will accomplish the same movement of the control mechanism as is effected by movement of the button 101. Such rotation may be obtained by providing a pinion 162 concentric with the support 161. Cooperating with this pinion is a rack 163 preferably of rectangular or angular cross section whereby it may be effectively held in the desired operating position by means of guides 164 on the base B. Formed in the disk 160 is an arcuate slot 165 into which extends a stop pin 166 projecting downwardly from the base of the apparatus. The length of the slot is such that it will just permit enough rotation of the disk to move the pin 109 from station S1 to station S4 or vice versa, the stop pin positively stopping the disk in desired position at these stations. Accidental movement away from these stations may be prevented by the provision of a comparatively strong tension spring 167 having one end secured to the disk and the opposite end attached to the base B, the point of attachment to the disk being such that after the disk passes a midpoint in moving between stations S1 and S4 the spring will be effective for assisting in completing such movement, the spring being placed under gradually increasing tension until such midpoint is reached.

For producing movement of the rack bar 163 it may be constructed either throughout, or may have end portions, of magnetic material adapted to act as cores for the solenoids 168 and 169. As viewed in Figures 7 to 10, it will be obvious that energization of the solenoid 168 will be effective for rotating the disk 160 in a clockwise direction, while energization of the solenoid 169 will effect rotation of the disk in the opposite direction. Thus, the solenoid 168 will be effective for moving the control mechanism from station S1 to station S4 to establish rewinding conditions, while the solenoid 169 will be operative at the conclusion of rewinding to reestablish projecting conditions.

The arrangement of the solenoids per se and certain other matter relating to the electrical circuits and mechanism directly operated electrically is claimed in my co-pending divisional application Serial Number 596,884, filed March 4, 1932.

The energizing of the respective solenoids at predetermined time intervals may obviously be accomplished automatically in a number of different ways. As illustrated diagramatically in Figures 3 and 4, this may be effected by the film f by securing to each end thereof a length of fire resisting or fireproof material m such as copper or the like, there being preferably a length of non-conducting material, such as asbestos a on at least one side of the film and either connecting the strip m thereto or serving to cover the strip m throughout a portion of its length. It may be assumed that the film is traveling in the direction indicated by the arrow in Figure 3 for projection purposes, such travel having effected display of the film and brought the strip m into contact with the upper guide 90 which is of conducting material and secured to the brake lever 88 by insulation i.

At this time current will flow from a suitable source b to one terminal t of the solenoid 168, thence through the solenoid to the terminal t' having a connection 170 with the guide 90. From the guide the circuit will be completed through the strip m to the container 4, spindle 2 and frame F connected by wire 171 to the opposite side of current source b. The solenoid thus energized will move rack bar 163 to the left and rotate disk 160 in a clockwise direction initially against the action of spring 167, and thereafter with the assistance of this spring to the limit allowed by the stop pin 166. During the first part of this movement the driving spindle clutch and the shutter clutch will be disengaged, while during the concluding part of the movement the rewinding spindle clutch will be thrown into engagement. This will start the rewinding of the film, and consequently break the circuit of solenoid 168.

It will be apparent that the foregoing operation is obtained without throwing any extra load onto the motor M. Its maximum duty, and consequently its size, may thus be determined entirely by the projecting and rewinding operations, together with cooling as hereinafter described. This enables the use of a motor of minimum size and current consumption, which may be continuously operated in the same direction during the use of the apparatus. It is also obvious that unless some supplemental control for the motor is provided, it will be necessary to strip the film from the sprocket prior to actual reversal during such time as the sprocket may be rotating at such speed as to render the film liable to injury. This may be effectively obviated by a construction as illustrated either in Figure 17 or 18.

As illustrated in Figure 17, the motor M may have a brake drum 172 with which cooperates a magnetic brake 173 under the control of magnets or solenoids 174 and 175 connected respectively in parallel with the solenoids 168 and 169 as clearly shown in the drawings. The respective circuits of the solenoids 174 and 175 each includes a movable armature piece 172'. As can be seen by those skilled in electric circuits, the armature piece 172' may be normally held by yielding means between two contacts 168' and 169' associated with the solenoids 168 and 169 respectively. The armature piece 172' may swing by gravity between the contacts 168' and 169' on a horizontal pivot 172'' as illustrated in Figure 17 or it may be normally held between the two contacts by opposed springs of well known construction. Upon energizing either of the solenoids 168 or 169 the piece 190' will be moved against the contact associated with the energized solenoid thereby energizing the associated brake-operating solenoid. Energization of either of the solenoids 168 or 169 will thereby be effective for simultaneously applying the magnetic brake for reducing the motor speed and consequently the speed of the sprocket or other feeding means. After the film has moved a predetermined distance in a rewinding direction, the circuit to solenoids 168 and 174 will be broken, thereby permitting the motor to operate at full speed for rewinding purposes.

At the conclusion of the rewinding, the strip m on the opposite end of the film will contact with the lower guide 94, also connected through insulation i with the brake lever 92. At this time current will flow from the source b to terminal t of the solenoid 169 and thence through the solenoid to terminal t' having connection 176 with the guide 94. From this guide current will pass through strip m to container 5, spindle 3 and frame F to connection 171 and source b. This will produce a reverse operation of disk 160, and consequently restore the parts to normal projecting position.

Since it is also desirable to slow down the rotation of the sprocket 50 during its re-engagement with the film, there is provided the magnetic means 175 which is operable for applying the brake so long as solenoid 169 is energized. As this solenoid remains energized until after normal projection again commences, but is de-energized by the film movement thus produced, it will be apparent that the desired speed conditions are obtained at the exact time required.

Figure 18:
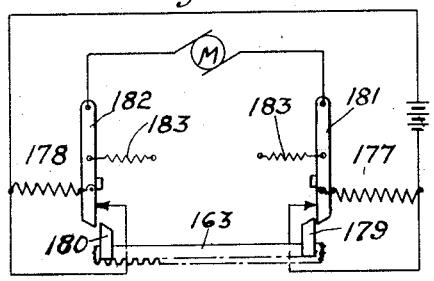
Figure 18 is a view similar to Figure 16 in which substantially the same results are accomplished by cutting resistance into the motor circuit.

Instead of utilizing a magnetic brake to accomplish the desired decrease in speed of the motor and sprocket, this may be obtained by the arrangement illustrated in Figure 18 in which the initial movement of the rack bar 163 in either direction cuts resistance 177 or 178 into the motor circuit by means of trips 179 and 180 which engage respectively resistance control fingers 181 and 182. It can be readily seen by those skilled in electric circuits that the resistances 177 and 178 normally will be short circuited; and the movement of the rack 163, toward the right for example, will operate in a well known way to open the portion of the motor circuit around the resistance 177 thereby compelling the current which operates the motor to flow through this additional resistance 177. As soon as the trips release the fingers 181 and 182, the springs 183 return the fingers to normal position. The trips 179 and 180 may obviously be adjustable on the rack bar for timing the exact period of cutting in resistance.

In addition to effecting a slowing down of the sprocket speed, it may also be desired to produce an actual dwell between the actual disengagement of the driving spindle clutch and the shutter clutch, and the engagement of the rewinding spindle clutch, or vice versa. This may be accomplished by the provision of a timing device in the form of a dash pot 184 with which cooperate pistons 185 and 186 carried by a projection 187 on the rack 163. The dash pot, which may be of double construction, has a controllable release 188 for each end thereof whereby the speed of travel of the piston in either direction may be controlled, the length of slot 189 through which the projection 187 extends determining the time at which the dash pot first becomes effective in either direction. This is desirable, as initially the rack bar should move at high speed to effect disengagement either of the driving spindle clutch and shutter clutch, or disengagement of the rewinding spindle clutch, depending on the direction of travel of the rack bar. Thereafter, the dash pot becomes effective, and by the setting of the release valves 188 variably times the period of dwell before the concluding movement of the rack bar is accomplished. This variable timing is of importance, as it provides flexibility for different operating conditions or films of different characteristics.

In Figure 11 there is illustrated a modified form of actuating mechanism in which the rack 163 is replaced by a segmental rack 163' having an extension 190 formed with a slot 191 into which projects a pin 192 on the solenoid core 193 operated by solenoids 168' and 169' as before described. The segmental rack may be formed with a slot 165' into which extends a stop pin 166'. A spring 167' similar in construction and operation to spring 167 may also be provided.

In Figure 12 there is illustrated a slightly modified form of circuit control in which the circuit is completed between a roller contact 195 with either guide 90 or 94 when a metallic portion $m$ of the film $f$ comes into position between the same.

Figure 13 illustrates still another embodiment, in which each reel or carrier R may have cooperating therewith a gravity operated contact finger 196 adapted when the film is completely unwound from either of the reels or carriers to come into contact with the metallic strip on the end of the film and complete the desired circuit.

Figure 14 is illustrative of still another form of circuit control in which the film $f$ is illustrated as having secured adjacent each end thereof a metal contact clip 198 adapted to engage brushes 199 at one end or brushes 200 at the other end constituting part, respectively, of the circuits for solenoids 168 and 169, and thereby completing the circuit when the clip at either end engages its corresponding brushes.

In Figure 15 the control for each end of the film is shown as comprising disks 201 engaging opposite sides of the film, and normally urged one toward the other by a spring 202. Adjacent each end this film has a portion 203 of reduced width, thereby permitting disks 201 to move together and engage contact 204 and thus complete the desired circuit.

The form of control shown in Figure 16 is desirable for some, but not all purposes, as it is not definitely operable in successive cycles at exactly the same points in the film travel, due to variations in the looseness of the film on the reels. It comprises, however, arms 205 pivotally mounted and secured to a link 206 cooperating at its lower end with a switch arm 207 adapted to engage either contact 208 or contact 209. One of the arms 205 cooperates with the film on the upper reel, while the other arm cooperates with the film on the lower reel. By reason of this construction, when the film on the lower reel builds up to a predetermined diameter the link 206 will be moved downwardly, bringing the switch arm 207 into engagement with contact 208 in the circuit of solenoid 168, and thereby effect rewinding. When rewinding has continued to such an extent as to provide a predetermined diameter of film on the upper reel, the link 206 will move upwardly and cause switch arm 207 to engage contact 209 in the circuit of solenoid 169. This will be effective for returning the parts to normal projecting position.

Figure 19:
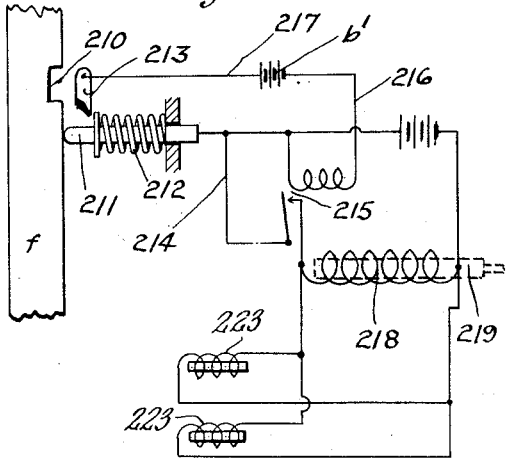
Figure 19 is a diagrammatic view illustrating a circuit including a time element adapted for periodically changing the projection from projection in motion to still projection and maintaining such projection for a predetermined time interval or multiple of such intervals.

As before pointed out, titles, legends and the like are of such nature that still projection thereof accomplishes all of the results desired. Where such still projection can be obtained, it is possible to effect a saving of a very substantial portion of each length of film, as the desired matter need only appear in a comparatively few frames, the film remaining stationary while one of these frames is in projecting position. In order, however, to make it possible to obtain the full advantages of such a condition, it must be possible to change automatically from normal projection of pictures in motion to so-called still projection. The present invention embodies means by which this change in operating conditions may be automatically produced, and the film held stationary for a predetermined unit time interval, or for a time interval representing any desired multiple of the unit interval. In Figure 19 there is illustrated in detail one form of mechanism by means of which such an operation is possible. In accordance with this embodiment, the film $f$ may be provided at desired intervals, determined entirely by the character of the indicia appearing on the film at such intervals and the consequent desired type of projection of such indicia, with notches 210. Normally, the edge of the film cooperates with a finger 211 urged toward the film by a spring 212. When the film occupies such a position that a notch 210 comes opposite the finger, the finger moves inwardly and trips a contact 213. The finger has a connection 214 with one terminal of a time relay 215, the opposite terminal of which is connected by wire 216 with the source of current $b'$. The contact 213 is in turn connected by wire 217 with the opposite side of the source of current. Thus, the movement of the finger inwardly automatically energizes the time relay. This relay in turn controls the energization of solenoid 218 into which extends the core 219 constituting part either of rack 163 as shown in Figures 7 to 10, or part of the core 193 of the form illustrated in Figure 11. In either case, the solenoid 218 when energized will be effective for moving the disk 160 in a clockwise direction. The dimensioning of the core 219 with respect to the center of the magnetic field of the solenoid 218 is such that the solenoid 218 will only be effective for moving the disk 160 a distance sufficient to bring the pin 109 to station S2, which is the station for still projection. The parts will remain in this position until the time relay, operating as well understood in the electrical art, breaks the circuit of solenoid 218. At such time the spring 167 or 167' will be effective for automatically restoring the parts to normal projecting position at station S1. The time relay may obviously be actuated by other means as shown, for example, for the solenoids 168 and 169.

If it is desired to have a still projection condition longer than that represented by one unit time interval of the time relay 215, the film may have a second notch 210 in the next picture frame, so that the foregoing cycle will be immediately repeated. This repetition may occur as often as desired.

It will be understood that with the parts in position at station S2, the heat shield is in position and the shutter is out of operation. Both of these features are extremely desirable. The heat shield enables the use of a light source such as to give the desired results for normal projection which is usually considered as requiring approximately 40 per cent more light than that necessary for still projection. The heat shield may then be designed to filter out or obstruct approximately 40 per cent of the light rays, thereby preventing the film from becoming injured by the heat of the light rays focused thereon. In other forms of apparatus in which a heat shield has not been provided, it has been necessary in order not to injure the film during periods of still projection, to use a light source insufficient for normal projection in motion. The stopping of the shutter during still projection is also desirable, as it not only insures clearer projection during periods of still projection, but also renders all of the light passing through the shield capable of being effectively utilized. In other forms of apparatus the shutter has been continuously operated during still projection. Thus it will be seen that for the light necessarily absorbed by the heat shield, when the still projection is effective, there is approximate compensation because of the cessation of movement of the shutter.

Figure 21:
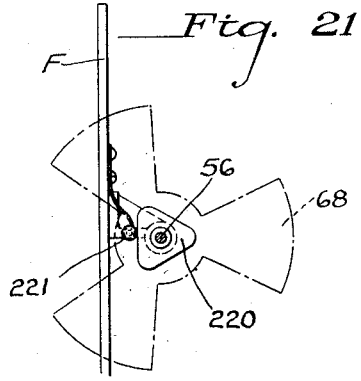

Since, however, the shutter is stopped during periods of still projection, it is necessary to insure means for stopping the shutter in such position that it will not be in the path of projection of the picture or indicia being projected. This may be insured, as shown in Figure 21, by providing on the shutter shaft 56 a cam 220 with which cooperates a spring pressed roller 221. If the disengagement of the shutter shaft should occur at a time when the roller is on one of the high points of the cam 220, it will be effective for rotating the shutter shaft as will be obvious. The high points of the cam occupy a definite relation to the shutter blades, so that the rotation, if any, effected by roller 221 will properly position the shutter.

Figure 20:
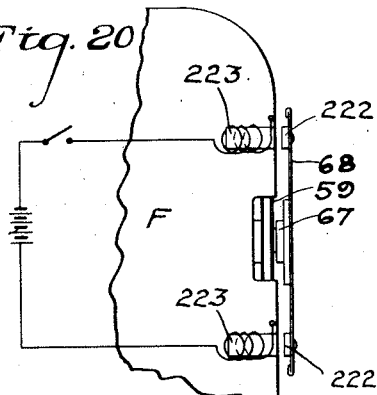
Figures 20 and 21 are diagrammatic views illustrating different forms of mechanism for insuring the shutter stopping in the desired position for still projection, Figure 20 illustrating a magnetic control, and Figure 21 a mechanical control.

In other cases, as illustrated in Figure 20, for example, the same results may be obtained magnetically. This magnetic operation may be produced by providing in each shutter blade a button 222 of magnetic material, or permanently magnetized material. Carried by the frame F in such position as to cooperate with two blades of the shutter simultaneously are magnets 223 adapted to attract the buttons 222 and thus properly position the shutter. If desired, the magnets instead of being permanent, may be connected in parallel with the solenoid 218, whereby during all periods when the solenoid 218 is effective for producing still projection, the magnets 223 will be energized.

Figure 2:
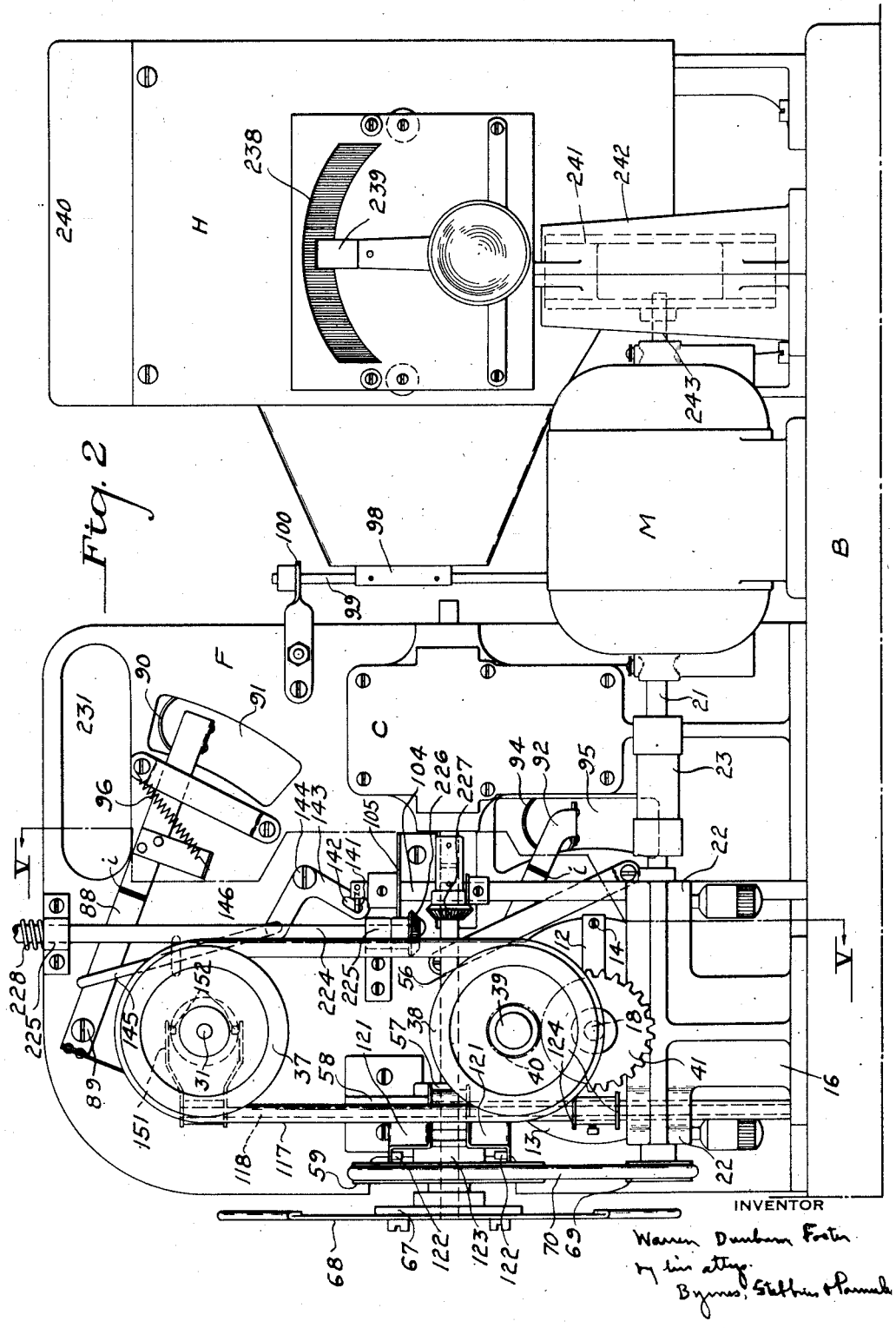
Figure 2 is a left side elevation of the machine.

Under certain conditions of operation, it may be desirable to intermittently actuate the film at a slower speed than that possible with the motor M, to obtain in effect the projection of a succession of pictures as still or stereopticon pictures. This may be accomplished by the provision of a supplemental driving means for the shutter shaft 56, and illustrated more particularly in Figures 2 and 5. This auxiliary driving mechanism comprises a shaft 224 mounted in bearings 225 on the back of the frame F. At its lower end this shaft carries a bevel gear 226 adapted to mesh with a similar gear 227 on the shutter shaft 56. Normally, the gears 226 and 227 are maintained out of engagement by means of a compression spring 228 effective for moving the shaft 224 upwardly. At its upper end this shaft carries a knurled actuating nut or knob 230 which may be grasped at will by an operator, thereby enabling him to bring the gears 226 and 227 into engagement for the slow rotation of the shutter shaft. At this time it will be understood that the control button will occupy a position at station S2.

To facilitate handling of the apparatus, the frame F may have a portion thereof shaped to provide a handle grip 231, as clearly illustrated in the drawings.

Carried by the frame F and positioned adjustably in line with the aperture through the gate is a lens casing 232 of any usual construction adapted for the focusing of a projected picture on a desired surface. Also, any usual form of condensing lens 233 may be utilized.

The combined lighting resistance and ventilating unit is contained within the housing H. Within this housing is mounted in any desired manner a lamp L adjustably carried by a bracket 234 having a pivotal mounting 235 in a bracket 236. Also having a pivotal mounting in the bracket 236 is a reflector R'.

Secured to one side of the housing is a resistance carrying unit 237 having a suitable resistance for the lamp L. Also mounted on the housing, and preferably exteriorly thereof, is a second resistance 238 with which cooperates a control finger 239 by means of which resistance may be cut into or out of the motor operating circuit at will.

The housing H at its lower end is preferably in spaced relation to the base B to permit the free circulation of air into the housing, and the top of the housing is closed by a slatted or louvre cover 240, permitting the egress of heated air from the housing. A positive circulation of cooling air through the housing is preferably continuously maintained in such manner as to be effective both on the lamp L and the lamp resistance 237. This circulation may be maintained by means of a fan 241 of suitable construction mounted in the fan casing 242, and driven by an extension 243 of the armature shaft of the motor M.

The resistance 237 may be originally proportioned with respect to the circuit with which the apparatus is to be used and therefore requires no adjustment. At times, however, it is preferable to operate the apparatus at varying speeds and by means of the rheostat or resistance 238 this may be effectively accomplished.

In Figure 1 of the drawings the film carriers are shown as being enclosed and as having pins 244 serving to prevent over-running of the film and protect the same generally. This protecting means may obviously be in the form of a casing or magazine, a pin, flange or roller, and can be mounted upon the projector itself, or upon the film container.

The combined brake and tension control tends to produce a uniform film feed and is adaptable to apparatus of the well known type utilizing prisms instead of shutters for projecting purposes. In such cases the tension control insures the required synchronization and registration of successive pictures.

The construction and location of the gate and sprocket enable these parts to be easily removed and other parts substituted for the accommodation of films of different widths. This affords increased flexibility in the use of the apparatus whereby it is not limited to films of any one width.

As illustrated in Figure 22, the film adjacent the end secured to the lower carrier, reel or support may have an elongated window w adapted to be in position over the sprocket at the conclusion of the rewinding operation. With this construction, when the driving spindle clutch is engaged, the take-up spindle 3 will be effective for frictionally initiating film movement. Thereafter, and while the film is in motion, it will be engaged in a normal manner by the sprocket so as to preclude possibility of shock or damage to the film.

Throughout the foregoing description reference has been made generally to projecting apparatus. The apparatus, however, is capable of use for regular photographic purposes in the taking of pictures.

Certain advantages of the present invention arise from the provision of an apparatus of the character adapted for the repetition display of a length of film, with means for automatically effecting reversal of the direction of travel of the film under such conditions that possibility of injury to the film either by heat, or by mechanical means, is materially minimized.

Other advantages arise from the provision in a photographic apparatus of means for electrically controlling the operation of the apparatus, the means preferably being such that the film itself is the determining element as to the time of reversal.

Still other advantages arise from the provision of a projecting apparatus embodying mechanisms adapted to occupy positions for either still projection or projection in motion, and automatic means preferably under the direct control of the film and comprising electrical means, for causing said mechanisms to occupy either position.

Additional advantages arise from reversing mechanisms for photographic apparatus of such nature that not only is a controllable dwell produced between reversals, but such that a change in speed of the film feeding means may be obtained at predetermined times. It has actually been found that the use of a fluid, and particularly air, is highly desirable for this purpose.

Further advantages arise from an automatically controlled reversing mechanism embodying a heat shield for the film and a shutter cut out effective in timed relation to each other to protect the film, enable use of a stronger light source, and to make possible the utilization of all light passed by the heat shield.

Still further advantages arise from a combined manual and automatic control, either of which may be utilized at will.

Other advantages arise from means necessarily operable at the commencement of normal feeding movement for first starting film feeding frictionally and then effecting positive feeding.

I claim:

1. In a film handling apparatus, a delivery member, a taking up member, an intermittently moving means for feeding a film between said delivery member and said taking up member, means for compensating for the differences in character of movement of said members and said feeding means, operable mechanism for initially positioning said compensating means and the film in operative relation one with the other, and means actuated by the moving film for operating said mechanism.

2. In a film handling apparatus, the combination of a film having a modified portion and a delivery member, a taking-up member, an intermittently moving means for feeding said film between said delivery member and said taking-up member, actuable means for compensating for the difference in character of movement of said members and said feeding means, operable mechanism for initially rendering said compensating means effective upon said film, and means actuated by said modified portion of the film for operating said mechanism.

3. In a film handling apparatus, the combination of a film having a modified portion, and a delivery member, a taking-up member, an intermittently moving means for feeding the film between said delivery member and said taking-up member, means for compensating for the difference in character of movement of said members and said feeding means, operable mechanism for removing said compensating means and the film from operative contact one with the other, and means actuated by said modified portion of the film for operating said mechanism.

4. In a film handling apparatus, a delivery member, a taking-up member, an intermittently moving means for feeding a film between said delivery member and said taking up member, actuable means for compensating for the difference in character of movement of said members and said feeding means, operable mechanism for initially rendering said compensating means effective upon the film, and electrically actuated means for operating said mechanism.

5. In a film handling apparatus, a film having a non-uniform cross section in a predetermined portion thereof, a delivery member, a taking up member, an intermittently moving means for feeding said film between said delivery member and said taking up member, actuable means for compensating for the difference in character of movement of said members and said feeding means, operable mechanism for initially rendering said compensating means effective upon the film, and means responsive to said non-uniform cross section for operating said mechanism.

6. In a film handling apparatus, a continuously operating film supporting member, a member for intermittently moving the film supported by said continuous member, a first source of power for driving said intermittent member, means for compensating for the difference in character of movement of said continuous member and said intermittent member, operable control mechanism for rendering said compensating means effective upon the film, and a second source of power for operating said control mechanism.

7. In a film handling apparatus, a continuously operating film supporting member, a member for intermittently moving the film supported by said continuous member, a first source of power for driving said intermittent member, means for compensating for the difference in character of movement of said members, operable control mechanism for rendering said compensating means effective upon the film, a second source of power for said mechanism, and means controlled by the film for applying said second source of power to said operable control mechanism whereby said mechanism is operated.

8. In a film handling apparatus, a continuously operating delivery support, a continuously operating take-up support, means for feeding a film intermittently in a projecting direction from said delivery support toward said take-up support for projecting pictures therefrom, operable means for compensating for the difference in character of movement of said delivery support, said take-up support, and said intermittent feeding means during normal intermittent projection, means for feeding the film continuously in the other direction for rewinding the film, means for rendering said compensating means operable upon the film, and means actuated by the film as it is moved in the latter portion of said rewinding cycle for actuating said means for rendering said compensating means operative so that during the succeeding projecting cycle the film is subjected to said compensating means.

9. In a film handling apparatus, a continuously operating delivery support, a continuously operating take-up support, means for feeding a film intermittently in a projecting direction from said delivery support toward said take-up support for projecting pictures therefrom, means for compensating for the difference in character of movement of said continuous delivery support, said continuous take-up support, and said intermittent feeding means, means for feeding the film continuously in the other direction for the purpose of rewinding the film, means for releasing said compensating means from operation upon the film during said rewinding cycle, and means actuated by the film as it is moved in the latter portion of said projecting cycle for actuating said releasing means.

10. In a film handling apparatus, a delivery reel and a take-up reel between which a film extends, an operable intermittently moving feeding means disposed between said reels, operable means for compensating for the differences in character of movement of said reels and said feeding means, operable means to move said film into operative engagement with said intermittently moving means, and means actuated by the film and operatively connecting said film feeding means, said film moving means, and said compensating means effective to initiate operation of said feeding means and said compensating means and to actuate said means to bring said film into engagement with said feeding means.

11. In a film handling apparatus, a continuously operating delivery member and a continuously operating take-up member between which a film extends, an intermittently operating member engaging the film between said delivery member and said take-up member for intermittently feeding the film from said delivery member toward said take-up member, a first film controlling member engaging the film between said delivery member and said intermittent member, a second film controlling member engaging the film between said intermittent member and said take-up member, means for moving said first film-controlling member so that it lengthens the stretch of the film between said delivery member and said intermittent feeding member, means for moving said second film-controlling member so that it lengthens the stretch of the film between said intermittent feeding member and said take-up member, and means responsive to the film as it is moved through said apparatus for operating both of said means for moving said film-controlling members.

12. In a film handling apparatus, a continuously operating film supporting member, an intermittently operating member engaging the film supported by said continuous member for feeding it in relation thereto, a film controlling member disposed between said continuous member and said intermittent member and bodily movable between a first position, wherein it is disposed upon one side of the path through which the film is normally fed and wherein it is without operative effect upon the film, and a second position, wherein it is disposed upon the other side of such path, the movement of said film controlling member from said first to said second position being effective to lengthen the stretch of the film between said continuous member and said intermittent member, means for moving said film controlling member between said positions, and means responsive to the film as it is fed through said apparatus for actuating said means for moving said film engaging member.

13. In a film handling apparatus, two continuously moving film supporting members between which a film extends, an operable intermittently moving feeding means disposed between said members, an openable gate disposed between said members through which said film passes, operable compensating means for initially increasing the length of film between said members for compensating for the differences in character of movement of said members and said feeding means, and means actuated by the film and interconnecting said feeding and compensating means and said gate and effective to initiate operation of said feeding means and said compensating means and to close said gate.

14. In a film handling apparatus, a first film supporting member, a second film supporting member, said supporting members being disposed in said apparatus to permit a film being moved between them, means for increasing the length of the stretch of film between said members, and means controlled by a modified portion of said film for operating said length increasing means, said film being formed with such a portion.

15. A film handling apparatus, comprising two continuously moving film supporting members between which a film extends, an operable intermittently moving feeding means for moving the film from one of said members and advancing it toward the other thereof, operable means for initially increasing the length of film between said members for compensating for the differences in character of movement of said members and said feeding means, and means actuated by the film and interconnecting said feeding means and said compensating means for initially rendering said feeding means operative upon the film and for operating said compensating means.

16. In a film handling apparatus, a first film-supporting member, a second film-supporting member, a film-contacting member movable between a first position wherein it defines one side of a relatively short path for a film between said supporting members and a second position wherein it defines one side of a relatively long path, operable control mechanism for moving said path-defining member from said first position to said second position, means for maintaining said path-defining member in said first position, means for feeding the film from one of said supporting members to the other through said short path while said path-defining member is maintained in said first position, and means actuated by the film as it is so fed through said short path for operating said control mechanism whereby said path-defining member is moved from said first position to said second position.

17. In a film handling apparatus, a first film-supporting member, a second film-supporting member, a film-contacting member movable between a first position wherein it defines one side of a relatively short path for a film between said supporting members and a second position wherein it defines one side of a relatively long path, operable control mechanism for moving said path-defining member from said first position to said second position, means for maintaining said path-defining member in said first position, means for feeding the film from one of said supporting members to the other through said short path while said path-defining member is maintained in said first position, and means operated in accordance with the amount of film which has been so fed through said short path for operating said control mechanism whereby said path-defining member is moved from said first to said second position.

18. In a film handling apparatus, two film supporting members between which a film extends, an openable gate positioned between said members through which the film supported thereby passes, said gate including a fixed section and a section movable relatively thereto between a first position wherein said movable section is positioned adjacent said fixed section wherein said gate is closed and a second position wherein said movable section is positioned relatively distantly from said fixed section wherein said gate is opened, means for feeding the film from one of said film supporting members to the other through said gate between the sections thereof, a film engaging member disposed between said gate and each of said supports and movable between a first position wherein it defines one side of a relatively long path between said supports and a second position wherein it defines one side of a relatively short path therebetween, control means interconnecting said movable gate section and said film engaging members and effective for moving said gate section between said first and second positions therefor and for moving said film engaging members between said first and second positions therefor, and means actuated by the moving film for operating said control means.

19. In a film handling apparatus, an openable gate, said gate including a fixed section and a section movable relatively thereto between a first position wherein said movable section is positioned adjacent said fixed section whereby said gate is closed and a second position wherein said movable section is positioned relatively distantly from said fixed section whereby said gate is opened, a support for a film, means for feeding the film between said support and said gate and through said gate between the sections thereof, a film engaging member disposed between said gate and said support and movable between a first position wherein it defines one side of a relatively long path between said support and said gate and a second position wherein it defines one side of a relatively short path therebetween, control means interconnecting said movable gate section and said film engaging member and effective for moving said gate section between said first and second positions therefor and for moving said film engaging member between said first and second positions therefor, and means actuated by the moving film for operating said control means.

20. In a film handling apparatus, an openable gate through which a film is fed, means for moving the film through said gate, a support for the film, means for guiding and controlling the tension of that section of the film extending between said support and said gate, said guiding and tension-controlling means including a film-engaging member movable from one position adjacent said gate wherein while said gate is open it forms one side of a path in which the film is initially positioned to another position wherein it forms one side of the path through which the film is fed while said gate is closed, means for opening said gate, and means actuated by the moving film for moving said film-engaging member from one of said positions to the other.

21. In a film handling apparatus, two film supports, means for intermittently feeding a film from one of said supports toward the other, said means including a toothed member positioned between said supports and adapted to engage the film, means for separating the film and said toothed member whereby said toothed member and the film are maintained free of engagement, means engaging the film between said intermittent toothed member and each of said supports and movable between one position wherein they define one side of a relatively short path between said supports and another position wherein they define one side of a relatively long path between said supports, means for moving said film-engaging path defining means from one of such positions to the other, control mechanism interconnecting said moving means and said means for separating the film and said intermittent feeding member and effective to operate both of the same, and means actuated by the moving film for operating said control mechanism.

22. In a film handling apparatus, two film supports, means for intermittently feeding a film from one of said supports toward the other, said means including a toothed member positioned between said supports and adapted to engage the film, means for separating the film and said toothed member whereby said toothed member and the film are maintained free of engagement, means engaging the film between said intermittent toothed member and one of said supports and movable between one position wherein it defines one side of a relatively short path between said last previously mentioned support and said intermittent toothed member and another position wherein it defines one side of a relatively long path between said last previously mentioned support and said intermittent member, means for moving said film-engaging path defining means from one of such positions to the other, control mechanism interconnecting said moving means and said means for separating the film and said intermittent feeding member and effective to operate both of the same, and means actuated by the moving film for operating said control mechanism.

23. In a film handling apparatus, two continuously operating film supporting members, mechanism for intermittently feeding a film from one of said members toward the other, means for rendering said feeding mechanism operative and inoperative upon the film for regularly advancing the film, mechanism for compensating for the difference in character of movement of said continuously operating film supporting members and said intermittent feeding mechanism, said compensating mechanism including members adapted to engage the film between each of said supporting members and said intermittent feeding mechanism and movable between a first position wherein they define one side of a relatively short path between said intermittent mechanism and each of said supporting members and a second position wherein they define one side of a relatively long path therebetween, means for moving said film engaging members between said positions, and sequential control means interlocking both of said means and actuated by the film and effective for operating each of the same in predetermined succession.

24. In a film handling apparatus, a continuously operating film supporting member, a mechanism for intermittently feeding a film in relation to said continuous member, means for rendering said feeding mechanism operative and inoperative upon the film for regularly advancing the film, mechanism for compensating for the difference in character of movement of said continuous member and said intermittent feeding mechanism, said compensating mechanism including a member adapted to engage the film between said continuous member and said intermittent feeding mechanism and movable between a first position wherein it defines one side of a relatively short path between said intermittent mechanism and said supporting member and a second position wherein it defines one side of a relatively long path therebetween, means for moving said film engaging member between said positions, and sequential control means interlocking both of said means and actuated by the film and effective for operating each of the same in predetermined succession.

25. In a film handling apparatus, a continuously operating delivery member, a continuously operating take up member, an intermittent member for intermittently feeding a film from said delivery member toward said take up member, a first path defining member disposed between said delivery member and said intermittent member and movable between a first position wherein a short path is defined between said delivery member and said intermittent member and a second position wherein a long path is defined therebetween, a second path defining member disposed between said intermittent member and said take up member and movable between a first position wherein a short path is defined between said intermittent member and said take up member and a second position wherein a long path is defined therebetween, means for moving said path defining members between said first and said second positions, mechanism for driving said intermittent member, means for reducing the speed of operation of said driving mechanism, and control means interconnecting said means for moving said path defining members between said positions and said speed reducing means for operating both of the same whereby the speed of said intermittent feeding member is controlled in timed relation to the movement of said path defining members so that the film is protected by the lowered speed of operation until said path defining members have been moved into their operating positions.

26. In a film handling apparatus, a continuously operating film supporting member, an intermittent member for intermittently feeding a film in relation to said continuous member, a path defining member disposed between said continuous member and said intermittent member and movable between a first position wherein a short path is defined between said continuous member and said intermittent member and a second position wherein a long path is defined therebetween, means for moving said path defining member between said first and said second positions, mechanism for driving said intermittent member, means for reducing the speed of operation of said driving mechanism, and control means interconnecting said means for moving said path defining member between said positions and said speed reducing means for operating both of the same whereby the speed of said intermittent feeding member is controlled in timed relation to the movement of said path defining member so that the film is protected by the lowered speed of operation until said path defining member has been moved into its operating position.

27. In a film handling apparatus, a continuously operating delivery member, a continuously operating take up member, an intermittent member for intermittently feeding a film from said delivery member toward said take up member, a first path definding member disposed between said delivery member and said intermittent member and movable between a first position wherein a short path is defined between said delivery member and said intermittent member and a second position wherein a long path is defined therebetween, a second path defining member disposed between said intermittent member and said take up member and movable between a first position wherein a short path is defined between said intermittent member and said take up member and a second position wherein a long path is defined therebetween, means for moving said path defining members between said first and said second positions, a motor for driving said intermittent member, resistance connectible in the circuit of said motor, means for controlling said resistance, and control means interconnecting said means for moving said path defining members and said resistance controlling means for operating both of the same whereby the speed of said intermittent feeding member is controlled in timed relation to the movement of said path defining members.

28. In a film handling apparatus, a continuously operating film supporting member, an intermittent member for intermittently feeding the film in relation to said continuous member, a path defining member disposed between said continuous member and said intermittent member and movable between a first position wherein a short path is defined between said continuous member and said intermittent member and a second position wherein a long path is defined therebetween, means for moving said path defining member betwen said first and second positions, a motor for driving said intermittent member, resistance connectible in the circuit of said motor, means for controlling said resistance, and control means interconnecting said means for moving said path defining member and said resistance controlling means for operating both of the same whereby the speed of said intermittent feeding member is controlled in timed relation to the movement of said path defining member.

29. In a film handling apparatus, a continuously operating delivery member, a continuously operating take up member, an intermittent member for intermittently feeding a film from said delivery member toward said take up member, a first path defining member disposed between said delivery member and said intermittent member and movable between a first position wherein a short path is defined between said delivery member and said intermittent member and a second position wherein a long path is defined therebetween, a second path defining member disposed between said intermittent member and said take up member and movable between a first position wherein a short path is defined between said intermittent member and said take up member and a second position wherein a long path is defined therebetween, means for moving said path defining members between said first and said second positions, mechanism for driving said intermittent member, means for controlling the speed of operation of said driving mechanism, control means for moving said path defining members between said positions and operating said speed controlling means whereby the speed of said intermittent feeding member is controlled in timed relation to the movement of said path defining members, and means actuated by the moving film for operating said control means.

30. In a film handling apparatus, a continuously operating film supporting member, an intermittent member for intermittently feeding a film in relation to said continuous member, a path defining member disposed between said continuous member and said intermittent member and movable between a first position wherein a short path is defined between said continuous member and said intermittent member and a second position wherein a long path is defined therebetween, means for moving said path defining member between said first and second positions, mechanism for driving said intermittent member, means for controlling the speed of operation of said driving mechanism, control means for moving said path defining member between said positions and operating said speed controlling means whereby the speed of said intermittent feeding member is controlled in timed relation to the movement of said path defining member, and means actuated by the moving film for operating said control means.

31. In a film handling apparatus, a continuously operating delivery member, a continuously operating take up member, an intermittent member for intermittently feeding a film from said delivery member toward said take up member, a first path defining member disposed betwen said delivery member and said intermittent member and movable between a first position wherein a short path is defined between said delivery member and said intermittent member and a second position wherein a long path is defined therebetween, a second path defining member disposed between said intermittent member and said take up member and movable between a first position wherein a short path is defined between said intermittent member and said take up member and a second position wherein a long path is defined therebetween, means for moving said path defining members between said first and said second positions, a motor for driving said intermittent member, resistance connectible in the circuit of said motor, means for operating said resistance, control means for moving said path defining members and operating said resistance controlling means, and means actuated by the film for operating said control means.

32. In a film handling apparatus, a continuously operating film supporting member, an intermittent member for intermittently feeding a film in relation to said continuous member, a path defining member disposed between said continuous member and said intermittent member and movable between a first position wherein a short path is defined between said continuous member and said intermittent member and a second position wherein a long path is defined therebetween, means for moving said path defining member between said first and second positions, a motor for driving said intermittent member, resistance connectible in the circuit of said motor, means for operating said resistance, control means for moving said path defining member and operating said resistance controlling means, and means actuated by the moving film for operating said control means.

33. In a film handling apparatus, a member engaging a film for maintaining a predetermined condition of tension thereupon, mechanism for moving said member out of operative engagement with the film, and means actuated by a predetermined portion of the film for operating said mechanism.

34. In a film handling apparatus, means for moving a film through said apparatus, compensating means movable between a first position wherein it is effective for producing a predetermined condition of tension upon the film and a second position wherein it is disposed out of operative contact with the film and hence is ineffective for such purpose, and threading means, said threading means including mechanism for moving said compensating means between said positions, and means actuated by the film as it is fed by said moving means for operating said mechanism for moving said tension producing means from one of said positions to the other thereof.

35. In a film handling apparatus, a film-supporting member, a member for feeding a film supported by said spindle, a resilient member movable between a first work position wherein it subjects to tension the portion of the film extending between said supporting member and said feeding member and a second work position wherein it frees the film from tension and guides the film between said members, control mechanism for moving said resilient member from one of said positions to the other, means for maintaining said resilient member in either of said work positions after it has been moved thereto, and means actuated by the film as it moves between said supporting member and said feeding member for operating said control mechanism.

36. In a film handling apparatus, a film-supporting member, a member for feeding a film supported by said member, a resilient member movable between a first work position wherein it subjects to tension the portion of the film extending between said supporting member and said feeding member and a second work position wherein it frees the film from tension and guides the film between said members, control mechanism for moving said resilient member from one of said positions to the other, means for maintaining said resilient member in either of said work positions after it has been moved thereto, and means including an electrical circuit controlled by a predetermined portion of the film as it moves between said supporting member and said feeding member for operating said control mechanism.

37. In a film handling apparatus, a film-supporting member, means for moving a film supported by said member, braking means operated by the film cooperating with said member, operable mechanism for initially positioning the film and said braking means in operative relation one with the other, and means actuated by predetermined zones of the moving film for operating said mechanism.

38. In a film handling apparatus, a film-supporting member, means for moving a film relatively thereto, braking means for cooperation with said member, said means including a film-engaging member, a braking element cooperating with said film-supporting member, and a connection between said film-engaging member and said braking element whereby said film-engaging member operates said braking element, mechanism for moving said film-engaging member into and out of operative relation with the film, and means actuated by the moving film for operating said mechanism.

39. In a film handling apparatus, a member for supporting a film, means for feeding the film supported thereby, braking means movable to a position wherein it cooperates with said member, mechanism for moving said braking means into such position, and means including a circuit controlled by the film for operating said mechanism.

40. In a film handling apparatus, a member for supporting a film, means for moving the film supported by said member, means for controlling the rate of rotation of said supporting member, said means including a member movable to and from a work position wherein it initially engages the film, operable connection between said film-engaging member and said film-supporting member, operable mechanism for moving said film-engaging member to and from said position and for rendering said connection operative upon said film supporting member, and means actuated by the moving film as it is so moved for operating said mechanism.

41. In a film handling apparatus, a film-supporting member, operable means for controlling the rate of rotation of said member, control mechanism for rendering said rotation-controlling means alternately operable and inoperable, and means including a circuit controlled by the film for operating said mechanism.

42. In a film handling apparatus, a film-supporting member, means for moving a film supported thereby, means for controlling the rate of rotation of said member, mechanism for bringing said rotation-controlling means into and out of operative engagement with the film, and automatic film-controlled means for operating said mechanism at predetermined intervals of film movement in accordance with the amount of film which has been fed by said moving means.

43. Film feeding apparatus comprising a delivery support, a take-up support, means for feeding a film from one of said supports to the other, means effective during the period of such film movement for controlling the tension upon the portion of the film which extends between said supports, and mechanism for controlling the bringing of said tension controlling means into operative relation with the film, said mechanism comprising a rotatable member connected to said tension means whereby the rotation of said member controls the engagement of said tension means with said film, means to rotate said member, and electrically actuated means for operating said rotating means.

44. In a film handling apparatus, two film supporting members, an openable gate disposed therebetween, means for feeding a film from one of said members toward the other thereof through said gate while said gate is substantially closed, and means for opening said gate, said gate opening means including an operable control member engaging the film between said gate and one of said supporting members and adapted to be operated by the film and connections between said control member and said gate for opening said gate upon the operation of said control member by the film.

45. In a film handling apparatus, the combination of a film having a modified portion and an openable gate, means for feeding said film through said gate while it is substantially closed, and means responsive to said modified portion for opening said gate.

46. In a film handling apparatus, the combination of a film having an irregular surface formation and an openable gate, means for feeding said film through said gate while it is substantially closed, and means responsive to said irregular surface formation for opening said gate.

47. In a film handling apparatus, an openable gate, a first means for feeding a film through said gate while it is substantially closed, a second means other than said feeding means for moving a film through said gate, guiding means so disposed in relation to said gate and to said first feeding means that the film may be moved by said second moving means through said gate while said gate is open without engaging said first feeding means, and means responsive to the film after the substantial completion of a cycle of movement thereof by said second means for closing said gate.

48. In a film handling apparatus, the combination of a film having a modified portion and an openable gate, means for feeding said film through said gate while it is open, and means responsive to said modified portion for closing said gate.

49. In a film handling apparatus, the combination of a film having an irregular surface formation in a part thereof and an openable gate, means for feeding said film through said gate while it is open, and means responsive to said irregular surface formation for closing said gate.

50. In a film handling apparatus, an openable gate, means for feeding a film through said gate while it is open, and means for closing said gate, said gate closing means including an electro-magnet, a circuit controlling said electro-magnet, and means engaging the film adjacent said gate and adapted to be operated by the film for controlling said circuit.

51. In a film handling apparatus, a gate comprising a plurality of sections, means for moving a film between two of the sections of said gate, mechanism for moving one of said sections relatively to another, and means controlled by a predetermined portion of the moving film for operating said mechanism.

52. In a film handling apparatus, a gate comprising a plurality of sections, mechanism for moving one of said sections relatively to another, means for feeding a film between said sections, a first motive means for operating said feeding means, a second motive means for operating said mechanism, and means controlled by the film for actuating said second motive means whereby it operates said mechanism.

53. In a film handling apparatus, two film supporting members, an openable gate disposed therebetween, said gate comprising a fixed section and a section movable relatively thereto, means for feeding a film from one of said supporting members toward the other thereof between the sections of said gate, motive means for said feeding means, means for moving said movable gate section relatively to said fixed gate section, separate motive means for said gate-section moving means, an operable control member engaging the film between one of said supporting members and said gate and adapted to be operated by the film, and connections between said control member and said second mentioned motive means for applying the power thereof to said movable gate section for moving said movable section upon the operation of said control member by the film.

54. In a film handling apparatus, a gate, said gate comprising a fixed section and a relatively movable section, means for feeding a film between said sections, and control mechanism for moving said movable section in relation to said fixed section, said control mechanism comprising two control stations, an operating member movable between said stations, powered means for moving said operating member between said stations, connections between said operating member and said movable gate section for moving said gate section upon the movement of said operating member, means governing and retarding the speed of operation of said powered means whereby the movement of said movable section is retarded and controlled, and means controlled by the film for actuating said operating member.

55. In a film handling apparatus, a gate, said gate comprising a fixed section and a relatively movable section, means for feeding a film between said sections, and control mechanism for moving said movable section in relation to said fixed section, said control mechanism comprising two control stations, an operating member movable between said stations, powered means for moving said operating member between said stations, connections between said operating member and said movable gate section for moving said gate section upon the movement of said operating member, and means governing and retarding the speed of operation of said powered means whereby the movement of said movable section is retarded and controlled.

56. Film handling apparatus including a gate comprising a plurality of sections and mechanism for moving one of said sections relatively to another, said mechanism comprising a first member which is rotatable, a second member which is longitudinally movable, means connecting said movable section of said gate and said second member for moving said section upon the longitudinal movement of said second member, means connecting said first and second members for longitudinally moving said second member upon the rotation of said first member, and control means for rotating said first member, said control means including timing means for actuating said control means at predetermined intervals.

57. Film handling apparatus including a gate comprising a plurality of sections and mechanism effective for moving one of said sections relatively to another, said mechanism including a first member which is rotatable, a second member which is longitudinally movable, a connection between said second member and said movable gate section for moving said section upon the longitudinal movement of said second member, means connecting said first and second members for causing the longitudinal movement of said second member upon the rotation of said first member, and means controlled by the film for rotating said first member, whereby the rotation of said first member causes the movement of said movable gate section.

58. In a film handling apparatus, a gate comprising a plurality of sections, mechanism for moving one of said sections relatively to another, a first member for moving a film through said gate, a second member for moving the film therethrough, and means controlled by the film while being moved by said first member for operating said gate-moving mechanism and actuating said second moving member.

59. In a film handling apparatus through which a film may be moved, a gate comprising a plurality of sections, operable mechanism for moving one of said sections relatively to another, a member for feeding a film therethrough, actuable mechanism for driving said feeding member, sequential control means interconnecting said mechanisms for operating said gate-moving mechanism and actuating said driving mechanism in sequential relation, and means actuated by the moving film for operating said control means.

60. In a film handling apparatus, a gate comprising a plurality of sections, operable mechanism for moving one of said sections relatively to another, actuable means for feeding a film through the gate, control means operatively interconnecting said gate-moving mechanism and said feeding means for operating said gate-moving mechanism and actuating said feeding means, and means controlled by a predetermined portion of the film for actuating said control means.

61. In a film handling apparatus, a gate comprising a plurality of sections, mechanism for moving one of said sections relatively to another, a plurality of means to feed a film through said gate, actuating means operatively interconnecting said gate moving mechanism and one of said feeding means, and means controlled by a predetermined portion of the film while being fed by one of said feeding means other than said last above mentioned feeding means for operating said actuating means.

62. In a film handling apparatus, a gate comprising a plurality of sections one of which is movable relatively to another, a member for feeding a film between said sections, means for bringing the film and said feeding member into operative relation one with the other, common operating mechanism for said movable section and said means, means separate from said feeding member for moving the film in relation to said gate, and means actuated by the moving film for operating said mechanism.

63. In a film handling apparatus, a first member for continuously feeding a film, a second member for intermittently feeding the film, guiding means so disposed in relation to said feeding members that said guiding means create a path through which a film may be moved by said continuous member past said intermittent member without operative engagement with said intermittent member, threading means for moving the film, as it is moved past said intermittent member by said continuous member, in a direction angular to said path and into operative engagement with said intermittent feeding member, and means actuated by the film for operating said threading means.

64. In a film handling apparatus, a first member for feeding a film, a second member for intermittently feeding the film, guiding means so disposed in relation to said feeding members that said guiding means create a path through which a film may be moved by said first member past said second member without operative engagement with said second member, threading means for moving the film, as it is moved past said second member by said first member, in a direction angular to said path and into operative engagement with said second feeding member, and automatic means necessarily operated in accordance with the amount of film fed by said second feeding member for operating said threading means.

65. In a film handling apparatus, a first member for feeding a film, a second member for feeding the film, guiding means so disposed in relation to said feeding members that said guiding means create a path through which a film may be moved by said first member past said second member without operative engagement therewith, threading means for moving the film, as it is moved past said second member by said first member, in a direction angular to said path and into operative engagement with said first feeding member, and means actuated by a predetermined portion of the film for operating said threading means.

66. In a film handling apparatus, a first member for feeding a film, a second member for feeding the same film, guiding means so disposed in relation to said feeding members that said guiding means create a path through which a film may be moved by said first member past said second member without operative engagement therewith, threading means for moving the film, as it is moved past said first member by said second member, in a direction angular to said path and into operative engagement with said second member, and means for operating said threading means, said operating means including an operable control member engaging the film and adapted to be operated by the film and connections between said control member and said threading means for operating said threading means upon the operation of said control member.

67. In a film handling apparatus, a first member for feeding a film, a second member for feeding the same film, guiding means so disposed in relation to said feeding members that said guiding means create a path through which a film may be moved by said first member past said second member without operative engagement therewith, threading means for moving the film, as it is moved past said first member by said second member, in a direction angular to said path and into operative engagement with said second member, and means for operating said threading means, said operating means including an electro-magnet, a circuit therefor, and an operable control member engaging the film and adapted to be operated thereby for controlling said circuit.

68. In a film handling apparatus, in combination a film having a modified portion therein and a first member for feeding said film through a predetermined path, a second member for feeding said film, threading means for moving the film, as it is moved by said first feeding member, in a direction angular to said path and into engagement with said second member, and means responsive to said modified portion for operating said threading means.

69. In a film handling apparatus, a feeding member, means for bodily removing a film from said member, and mechanism controlled by the film for actuating said means.

70. In a film handling apparatus, a toothed member for feeding a film, means for protecting the film from the teeth of said member, and mechanism actuated by the film for operating said means.

71. In a film handling apparatus, a feeding member, means for bodily removing a film from said member, and mechanism controlled by a predetermined portion of the film for actuating said means.

72. In a film handling apparatus, a first member for moving a film, a second toothed member adapted to engage and move the film, means for rendering the teeth of said moving member inaccessible by the film, control means for rendering said means inoperative whereby the film may be engaged by the teeth of said second member, and mechanism actuated in accordance with the amount of film moved by said first member for operating said control means.

73. In a film handling apparatus, a feeding member, means for bodily removing a film from said member, mechanism for operating said removing means including an electrical circuit, and electrically actuated means made effective by a predetermined zone of the film for closing and opening said circuit.

74. In a film handling apparatus, a film having a portion of non-uniform cross section, a member for feeding said film, means for causing relative movement between said film and said feeding member whereby said film is removed therefrom, and means responsive to said non-uniform cross section for operating said removing means.

75. In a film handling apparatus, a toothed member for feeding a film, a shielding member movable between a first position wherein it embraces the area of operation of said feeding member thereby protecting the film from the teeth thereof and a second position wherein it is removed from said protective relation thereby permitting engagement between the film and the teeth of said member, operating means for moving said shielding member from one of said positions to the other, and means operated by the film for actuating said operating means.

76. In a film handling apparatus, a feeding member, means for bodily removing a film from said member, mechanism for operating said removing means, and film controlled automatic means for actuating said mechanism at predetermined intervals of film movement in accordance with the amount of film which has been moved by said feeding member.

77. Film feeding apparatus comprising a feeding member adapted to engage a film, means for effecting movement of the film in either direction, means for shielding said film from said feeding member during the movement of the film in one direction, and an electrically actuated means controlled by the film for operating said shielding means.

78. Film feeding apparatus comprising a feeding member adapted to engage a film, means for effecting movement of the film in either direction, means for shielding the film from said feeding member during the movement of the film in one direction, and means actuated by the film for controlling both of said means.

79. In a film handling apparatus, a member for feeding a film, means for bringing the film into operative relation with said member, mechanism separate from said member for moving the film through said apparatus, means for rendering said feeding member inaccessible by the film, control mechanism operatively interconnecting both of said means for rendering said means alternately operable, and means controlled by the moving film for operating said control mechanism.

80. In a film handling apparatus, a member for feeding a film, means for rendering said feeding member inaccessible by the film, means for rendering said last named means inoperative whereby the film and said feeding member may be placed in operative relation one with the other, means for placing the film and said feeding member in such operative relation one with the other, control mechanism interconnecting said means for rendering inoperative said means for rendering said feeding means inaccessible by the film and said means for placing the film and said feeding member in operative relation one with the other, means other than said feeding member for moving the film through said apparatus, and means actuated by the film as moved by said last previously mentioned moving means for operating said control mechanism.

81. In a film handling apparatus, a member for feeding a film, means separate from said member for moving said film through said apparatus, means for bringing the film into operative relation with said member, means for rendering said feeding member inaccessible by the film, and mechanism controlled by a predetermined portion of the film for rendering said means alternately operable.

82. In a film handling apparatus, feeding means for a film, means for bodily moving the film out of engagement with said feeding means, control mechanism operatively interconnecting both of said means and effective for rendering said feeding means inoperative and said bodily moving means operative, and means controlled by the film for actuating said mechanism.

83. In a film handling apparatus, a member for moving a film in one direction, means for driving said moving member, means for bodily moving the film out of engagement with said moving member, means for moving the film in the other direction, operable control mechanism interconnecting all of said means for operating all of said means, and means actuated by the film for operating said control mechanism.

84. In a film handling apparatus, a toothed member for feeding a film in one direction, means for separating the film and the teeth of said member, means for feeding the film in the other direction, control mechanism interconnecting said feeding member, said separating means and said feeding means for first rendering said feeding member inoperative and said separating means operative and thereafter rendering said feeding means operative, and automatic film-controlled means necessarily operated in accordance with the amount of film movement for actuating said mechanism at predetermined intervals.

85. In a film handling apparatus, a member for feeding a film in one direction, a member for bodily moving the film out of engagement with said feeding member, means for feeding the film in the other direction, mechanism for first rendering said feeding member inoperative and said moving means operative and thereafter rendering said feeding means operative, and means including an electrical circuit operated by predetermined zones of the film for actuating said mechanism at predetermined intervals.

86. In a film-handling apparatus, a member for feeding a film, means for driving said feeding member, means for bodily moving the film out of engagement with said feeding member, control mechanism interconnecting said driving means and said moving means for rendering said driving means inoperative and said moving means operative, said control mechanism including a movable actuating member, automatic film-controlled means operated at predetermined intervals in accordance with the amount of film movement for moving said actuating member, and manual means operable at will for moving said actuating member.

87. In a film handling apparatus, a feeding member for a film, means for bodily moving the film out of engagement with said feeding member, means for operating said moving means, and means for necessarily changing the speed of operation of said feeding member preparatory to the operation of said means for bodily moving the film out of engagement with said feeding member.

88. In a film handling apparatus, a toothed feeding member for the film, means for driving said feeding member, means for bodily moving the film from engagement with the teeth of said member, and control means operatively interconnecting said driving means and said bodily moving means for first changing the speed of operation of said driving means and thereafter operating said means for bodily moving the film from engagement with said member.

89. In a film handling apparatus, a toothed feeding member for a film, means for driving said feeding member, means for bodily moving the film out of engagement with the teeth of said feeding member, control means operatively interconnecting said driving means and said bodily moving means for first reducing the speed of said driving means and thereafter operating said bodily moving means, and means actuated by the film as moved by said feeding member for operating said contral means.

90. In a film handling apparatus, a rewinding spindle, a clutch for said rewinding spindle, a taking up spindle, a clutch for said taking up spindle, means for intermittently feeding a film from said rewinding spindle to said taking up spindle, means for bodily removing the film from said feeding means, control mechanism for rendering said taking up spindle clutch and said feeding member clutch inoperative, operating said film removing means and rendering said rewinding spindle clutch operative, and means effective to determine the speed of operation of said control mechanism.

91. In a motion picture projector, means for feeding a film intermittently in one direction whereby successive images are projected therefrom, means for feeding the film continuously and more rapidly in another direction whereby the film is rewound, mechanism operatively interconnecting both of said feeding means for rendering said means alternately operable, a manually operable movable actuating member, connections between said actuating member and said mechanism for operating said mechanism upon the movement of said actuating member for controlling said mechanism whereby said mechanism may be operated at will, automatic control means, means operable at predetermined periods for actuating said control means, and connections between said control means and said mechanism for operating said mechanism upon the actuation of said control means whereby said mechanism is operated predeterminedly.

92. In a film handling apparatus, a rewinding spindle, a clutch for said rewinding spindle, a taking up spindle, a clutch for said taking up spindle, means for intermittently feeding a film from said rewinding spindle to said taking up spindle, a clutch for said feeding means, means for bodily removing the film from said feeding means, mechanism for rendering said rewinding spindle clutch inoperative, moving said film removing means to inoperative position and rendering said feeding means clutch operative and said taking up spindle clutch operative, and means effective to control the speed of operation of said control mechanism.

93. In a film handling apparatus, a rewinding spindle, a rewinding spindle clutch, a taking up spindle, a taking up spindle clutch, and control mechanism for rendering one of said clutches inoperative and the other operative, said control mechanism comprising two operating stations, an actuating member movable between said stations, connections between said clutches and said actuating member for rendering said rewinding spindle clutch inoperative and said taking up spindle clutch operative upon the movement of said actuating member to one of said stations, connections between said actuating member and said clutches for rendering said taking up spindle clutch inoperative and said rewinding spindle clutch operative upon the movement of said actuating member to the other of said stations, and means effective to determine the speed of movement of said actuating member as it travels between said stations.

94. In a film handling apparatus, a rewinding spindle, a rewinding spindle clutch, a taking up spindle, a taking up spindle clutch, and control mechanism for rendering one of said clutches inoperative and the other operative, said control mechanism comprising two operating stations, an actuating member movable between said stations, connections between said clutches and said actuating member for rendering said rewinding spindle clutch inoperative and said taking up spindle clutch operative upon the movement of said actuating member to one of said stations, connections between said actuating member and said clutches for rendering said taking up spindle clutch inoperative and said rewinding spindle clutch operative upon the movement of said actuating member to the other of said stations, means effective to determine the speed of movement of said actuating member as it travels between said stations, and powered means for moving said actuating member between said stations.

95. In a film handling apparatus, a first means for moving a film in one direction, a clutch for said first moving means, means for moving the film in the other direction, a clutch for said second moving means, and control mechanism for operating said clutches alternatively, said control mechanism comprising an actuating member movable to one position wherein it is operatively connected to one of said clutches and to another position wherein it is operatively connected to the other of said clutches, and timing means effective to determine the speed of movement of said actuating member between said positions.

96. In a film handling apparatus, a first means for moving a film in one direction, a clutch for said first moving means, means for moving the film in the other direction, a clutch for said second moving member, and control mechanism for operating said clutches alternatively, said control mechanism comprising an actuating member movable to one position wherein it is operatively connected to one of said clutches and to another position wherein it is operatively connected to the other of said clutches, means actuated by the moving film for moving said actuating member between said positions, and timing means effective to determine the speed of movement of said actuating member between said positions.

97. In a film handling apparatus, a first means for feeding a film in one direction, a second means for feeding a film in the other direction, actuable control means interconnecting said first and second feeding means and effective for rendering said first feeding means inoperative and said second feeding means operative and assuring a predetermined period between the cessation of operation of said first means and the beginning of operation of said second means, and means controlled by the moving film for actuating said control means.

98. In a film handling apparatus, mechanism for feeding a film in one direction, mechanism for feeding the film in the opposite direction, driving means for both of said mechanisms, control means for rendering said mechanisms alternately operable, and means operatively connected with said control means and actuated by the film for changing the speed of said driving means prior to the initial cessation of operation of the first named feeding mechanism and the beginning of operation of the other feeding mechanism.

99. In a film handling apparatus, mechanism for feeding a film in one direction, mechanism for feeding the film in the other direction, driving mechanism for said feeding mechanisms, means for rendering said feeding mechanisms alternately operable, means for reducing the speed of operation of said driving means, and control means actuated by the film and interconnecting both of said previously recited means for operating them.

100. In a film handling apparatus, means for feeding a film in one direction, means for feeding the film in the other direction, mechanism for driving both of said feeding means, means for reducing the speed of operation of said driving means, control mechanism operatively interconnecting all of said means for alternately operating each of said feeding means and for operating said speed-reducing means in timed relation to such alternations, and means including an electrical circuit actuated by predetermined zones of the film for operating said control mechanism.

101. In a film handling apparatus, means for moving a film in one direction, means for moving the film in the other direction, a motor for driving both of said film-moving means, resistance connectible in the circuit of said motor, operable means for connecting said resistance in said circuit, and control means operatively interconnecting both of said film-moving means and said means for connecting resistance in said motor circuit for operating said film-moving means alternately and for operating said means for connecting resistance in said motor circuit in timed relation to such alternations.

102. In a film handling apparatus, a rewinding member for a film, a taking up member for the film, a first source of power, a clutch for operatively connecting each of said members with said source of power, means operatively interconnecting said clutches for operating said clutches alternately, a second source of power for operating said means, and means actuated by engagement with the film for applying said second source of power to said means whereby said means is operated.

103. In a film handling apparatus, a rewinding spindle, and a taking up spindle between which a film moves, a rewinding spindle clutch, a taking up spindle clutch, and control mechanism for rendering one of said clutches inoperative and the other operative, said control mechanism comprising two operating stations, an actuating member movable between said stations, connections between said clutches and said actuating member for rendering said rewinding spindle clutch inoperative upon the movement of said actuating member to one of said stations, connections between said actuating member and said clutches for rendering said taking up spindle clutch inoperative and said rewinding spindle clutch operative upon the movement of said actuating member to the other of said stations, and means including an electrical circuit controlled by the film as it moves between said spindles for moving said actuating member between said stations.

104. In a film handling apparatus, a rewinding spindle, a clutch for said rewinding spindle, a taking-up spindle, a clutch for said taking-up spindle, means engaging a film between said spindles for advancing the film from said rewinding spindle toward said taking-up spindle, electrical means actuated by the film for first rendering said rewinding spindle clutch inoperative and said taking up spindle clutch operative and thereafter rendering said taking up spindle clutch inoperative and said rewinding spindle clutch operative, and means for rendering said film advancing means inoperative upon the film after said taking-up spindle clutch has been rendered inoperative and said rewinding spindle clutch rendered operative.

105. In a film handling apparatus, a rewinding spindle, a clutch for said rewinding spindle, a taking up spindle, a clutch for said taking up spindle, a member for intermittently feeding the film from said rewinding spindle to said taking-up spindle, a clutch for said intermittent feeding member, and electrical means actuated by the film for first rendering said rewinding spindle clutch inoperative and said feeding member clutch operative and said taking up spindle clutch operative whereby the film is fed in a projecting direction through said apparatus and thereafter rendering said taking-up spindle clutch inoperative and said feeding member clutch inoperative and said rewinding spindle clutch operative whereby the film is rewound within said apparatus.

106. In a film handling apparatus, a rewinding spindle, a clutch for said rewinding spindle, a taking up spindle, a clutch for said taking up spindle, means for intermittently feeding the film from said rewinding spindle to said taking up spindle, a clutch for said feeding means, means for bodily removing the film from said feeding means, and means actuated by the film for first rendering said rewinding spindle clutch inoperative, moving said film removing means to inoperative position, and rendering said feeding member clutch operative and said taking up spindle clutch operative, whereby the film is fed in a projecting direction through said apparatus, and thereafter rendering said take-up spindle clutch inoperative and said feeding member clutch inoperative, moving said film removing means to operative position, and rendering said rewinding spindle clutch operative, whereby the film is rewound.

107. In a film handling apparatus, a rewinding spindle, a clutch for said rewinding spindle, a taking up spindle, a clutch for said taking up spindle, means for intermittently feeding the film from said rewinding spindle to said taking up spindle, means for bodily removing the film from said feeding means, and an electrical circuit for first rendering said rewinding spindle clutch inoperative, moving said film removing means to inoperative position, and rendering said taking up spindle clutch operative, whereby the film is fed in a projecting direction through said apparatus, and thereafter rendering said take-up spindle clutch inoperative, moving said film removing means to operative position, and rendering said rewinding spindle clutch operative, whereby the film is rewound.

108. In a motion picture projector, a rewinding spindle, a rewinding spindle clutch, a taking up spindle, a taking up spindle clutch, a member for feeding a film intermittently from said rewinding spindle to said taking up spindle, a clutch for said member, mechanism operatively interconnecting said clutches and first effective for rendering said rewinding spindle clutch inoperative and said taking up spindle clutch operative and said feeding member clutch operative whereby the film is projected and thereafter effective for rendering said taking up spindle clutch and said feeding member clutch inoperative and said rewinding spindle clutch operative whereby the film is rewound, manual means for controlling said mechanism at will, and means actuable by a predetermined portion of the film for controlling said mechanism predeterminedly.

109. In a motion picture projector, a rewinding spindle, a rewinding spindle clutch, a taking up spindle, a taking up spindle clutch, a member for feeding a film intermittently from said rewinding spindle to said taking up spindle, a clutch for said member, mechanism operatively interconnecting said clutches and first effective for rendering said rewinding spindle clutch inoperative and said taking up spindle clutch operative and said feeding member clutch operative whereby the film is projected and thereafter effective for rendering said taking up spindle clutch and said feeding member clutch inoperative and said rewinding spindle clutch operative whereby the film is rewound, mechanism manually movable to a plurality of operating stations for controlling said first named mechanism at will, and means actuated by a predetermined movement of the film for controlling said mechanism predeterminedly.

110. In a motion picture projector, a rewinding spindle, a rewinding spindle clutch, a taking up spindle, a taking up spindle clutch, a member for feeding a film intermittently from said rewinding spindle to said taking up spindle, a clutch for said member, mechanism operatively interconnecting said clutches and first effective for rendering said rewinding spindle clutch inoperative and said taking up spindle clutch and said feeding member clutch operative whereby the film is projected and thereafter effective for rendering said taking up spindle clutch and said feeding member clutch inoperative and said rewinding spindle clutch operative whereby the film is rewound, manual means for controlling said mechanism at will, and means including an electrical circuit closed and opened by predetermined portions of the film for controlling said mechanism predeterminedly.

111. In a film handling apparatus, a rewinding spindle, a clutch for said rewinding spindle, a taking up spindle, a clutch for said taking up spindle, means engaging a film between said spindles for advancing the film from said rewinding spindle toward said taking-up spindle, mechanism for first rendering said rewinding spindle clutch inoperative and said taking up spindle clutch operative and thereafter rendering said taking up spindle clutch inoperative and said rewinding spindle clutch operative, means controlled by predetermined zones of the film for operating said mechanism, and means for rendering said film advancing means inoperative upon the film upon the the operation of said mechanism.

112. In a film handling apparatus, a rewinding spindle, a clutch for said rewinding spindle, a taking up spindle, a clutch for said taking up spindle, means engaging a film between said spindles for advancing the film from said rewinding spindle toward said taking-up spindle, mechanism for first rendering said rewinding spindle clutch inoperative and said taking up spindle clutch operative and thereafter rendering said taking up spindle clutch inoperative and said rewinding spindle clutch operative, a circuit operated by predetermined portions of the film for operating said mechanism, and means for rendering said film advancing means inoperative upon the film upon the operation of said mechanism.

113. In a film handling apparatus, a rewinding spindle, a clutch for said rewinding spindle, a taking up spindle, a clutch for said taking up spindle, means engaging a film between said spindles for advancing the film from said rewinding spindle toward said taking-up spindle, mechanism for first rendering said rewinding spindle clutch inoperative and said taking up spindle clutch operative and thereafter rendering said taking up spindle clutch inoperative and said rewinding spindle clutch operative, a circuit operated by predetermined spaced portions of the film for operating said mechanism, and means for rendering said film advancing means inoperative upon the film upon the operation of said mechanism.

114. In a film reel reversing mechanism, a pair of clutches each connectible to a film reel, a film of non-uniform cross section adjacent its ends, shifting members for each of the clutches interconnected to engage one clutch and disengage the other, an armature, connections between the armature and shifting members for actuating them from the armature, coils for operating the armature, and circuit controlling contacts which are closed when the non-uniform cross section portion of the film is wound off the adjacent reel.

115. In a film reel reversing mechanism, a pair of clutches each connectible to a film reel, a film of non-uniform cross-section adjacent its ends, shifting members for each of the clutches interconnected to disengage one clutch and to engage the other in timed relation to such disengagement, an armature, connections between the armature and the shifting members for actuating them from the armature, a coil structure for operating the armature, and circuit controlling contacts which are closed in timed relation to the winding of the non-uniform cross-section portion of the film off one of the reels.

116. In a film reel reversing mechanism, a pair of clutches each connectible to a film reel, a film of non-uniform cross-section adjacent its ends, control mechanism for operating said clutches, an armature, an operating connection between the armature and said mechanism, a coil structure for operating the armature, and circuit controlling contacts which are closed by the winding of the non-uniform cross-section portion of the film off the adjacent reel.

117. In a film reversing mechanism, a pair of clutches each connectible to a film reel, shifting members for each of the clutches interconnected to engage one clutch and to disengage the other in timed relation to such engagement, an armature, coils for operating said armature, a longitudinally movable control member, means connecting one end of said member and said armature whereby the passage of an electrical current through one of said coils moves said control member in one direction and the passage of an electrical current through the other of said coils moves said member in the opposite direction, and mechanism connecting the other end of said control member and said shifting members and so constructed and arranged that such movement in one of such directions operates one of said shifting members and such movement in the other of such directions operates the other of said shifting members.

118. In a film handling apparatus, a pair of shaft-supported reels for rolling and re-rolling a film, an electric motor, a shaft continuously driven by said motor and disposed adjacent each reel shaft, means for connecting either of the reel shafts to the corresponding continuously driven shaft and substantially simultaneously disconnecting the other shafts, and operating means therefor comprising an instrumentality carried by the film adjacent each end thereof and members yieldingly held against the edge of the film, and a device under the control of said members for drivingly connecting the motor to the other reel shaft.

119. In a film handling apparatus, a pair of shaft-supported reels for rolling and re-rolling a film, an electric motor, a shaft continuously driven by said motor and disposed adjacent each reel shaft, a pair of clutches for connecting one reel shaft with the corresponding continuously driven shaft and disconnecting the other shafts, electromagnetic means for controlling the clutches, and an electric contact responsive to a device carried by the film adjacent the ends thereof for energizing said electromagnetic means.

120. The combination with a film having cut-out portions along the edge adjacent each end, a pair of film winding and rewinding reels, and driving mechanism, of electromagnetic means, means for actuating said electromagnetic means to connect said reels to said driving mechanism to transfer the film from the winding reel to the rewinding reel, a second means for actuating said electromagnetic means to connect said reels to said driving mechanism to transfer the film from the rewinding reel to the winding reel, and a circuit making device for controlling both said connecting means which device is pressed into the cut-out portions in the edge of the film as it is wound from one of the reels.

121. The combination with a film having a cut-out along the edge adjacent each end, a pair of film winding and rewinding reels, driving mechanism for the reels operating in one direction, a pair of clutches, each clutch being operable to connect said driving mechanism to said winding reel to transfer the film in one direction, and the other clutch being operable to connect said driving mechanism to said rewinding reel to transfer the film in the opposite direction.

122. In mechanism for winding and rewinding film reels, driving mechanism, clutches for connecting either the winding reel or the rewinding reel to said driving mechanism for reversing the direction of winding, means for actuating said clutches, a controlling means for controlling the timing of the actuation of said clutches, said controlling means including a movable member for each reel, the members being held against the edge of film thereon and moved when a narrowed portion of the film passes them.

123. In mechanism for winding and rewinding film reels, driving mechanism operating in one direction, control means for rendering one of said reels operative and the other inoperative, and means for actuating the control means, said control means comprising a clutch associated with each reel, and means for operating said clutches, said means comprising a primary power source for shifting the clutches, substantially simultaneously to operatively connect one of said clutches with said driving mechanism and disconnect the other clutch, and devices responsive to the movement of an instrumentality carried adjacent the end of the film past a movable member to move the same and thereby control the operation of said primary power source.

124. In mechanism for winding and rewinding film reels, control means for substantially simultaneously rendering one of said reels operative and the other inoperative, and means for actuating the control means, said control means comprising a clutch associated with each reel, and means for operating said clutches, said means comprising electromagnetic devices for shifting the clutches, and contacts responsive to the movement of a cut-out in the edge of the film past a movable contact for controlling the operation of electromagnetic devices.

125. In a film reel reversing mechanism, a pair of driving clutches each connectible to a film reel, a pair of clutch shifting members, a common actuating member interconnected with both said clutch shifting members to operate the same to engage one clutch with one reel and substantially simultaneously disengage the other from another reel, and devices actuable by the movement of a non-uniform portion of the film for controlling the actuating member.

126. The combination with a film for a cut-out along the edge adjacent each end, a pair of film winding and re-winding reels, mechanism operating in one direction for transferring the film back and forth between the reels, and mechanism for reversing the direction of motion of the film, of means for actuating the reversing mechanism, said last mentioned means including movable members carried adjacent the film where it comes off the reels, and actuating means for pressing the movable members into engagement with the edges of the film and in turn to cause the movable members being actuated when being pressed into cut-outs, said movable members when so actuated by engagement with the cut-outs in turn actuating said reversing mechanism.

127. In a film handling apparatus, a rewinding spindle, a rewinding spindle clutch, and mechanism for operating said clutch, said mechanism comprising a first rotatable member, connection between said first member and said clutch whereby the rotation of said first member operates said clutch, a second rotatable member, connection between said rotatable members whereby the rotation of said second member rotates said first member, and magnetic means for rotating said second member.

128. In a film handling apparatus, a rewinding spindle, a rewinding spindle clutch, and mechanism for operating said clutch, said mechanism comprising a first rotatable member, connection between said first member and said clutch whereby the rotation of said first member operates said clutch, a second rotatable member, connection between said rotatable members whereby the rotation of said second member rotates said first member, and means controlled by the film for rotating said second member.

129. In a film handling apparatus, a rewinding spindle, a rewinding spindle clutch, and mechanism for operating said clutch, said mechanism comprising a first rotatable member, a connection between said first member and said clutch whereby the rotation of said first member operates said clutch, a second rotatable member, a connection between said rotatable members whereby the rotation of said second member rotates said first member, and means operable at predetermined times for rotating said second member.

130. In a film handling apparatus, a taking-up spindle, a taking-up spindle clutch, and mechanism for operating said clutch, said mechanism comprising a first rotatable member, connection between said first member and said clutch whereby the rotation of said first member operates said clutch, a second rotatable member, a connection between said rotatable members whereby the rotation of said second member rotates said first member, and magnetic means for rotating said second member.

131. In a film handling apparatus, a taking-up spindle, a taking-up spindle clutch, and mechanism for operating said clutch, said mechanism comprising a first rotatable member, a connection between said first member and said clutch whereby the rotation of said first member operates said clutch, a second rotatable member, connection between said rotatable members whereby the rotation of said second member rotates said first member, and means controlled by the film for rotating said second member.

132. In a film handling apparatus, a taking-up spindle, a taking-up spindle clutch, and mechanism for operating said clutch, said mechanism comprising a first rotatable member, connection between said first member and said clutch whereby the rotation of said first member operates said clutch, a second rotatable member, a connection between said rotatable members whereby the rotation of said second member rotates said first member, and means operable at predetermined times for rotating said second member.

133. In a film handling apparatus, a feeding member, a feeding member clutch, and mechanism for operating said clutch, said mechanism comprising a first rotatable member, a connection between said first member and said clutch whereby the rotation of said first member operates said clutch, a second rotatable member, connection between said rotatable members whereby the rotation of said second member rotates said first member, and magnetic means for rotating said second member.

134. In a film handling apparatus, a feeding member, a feeding member clutch, and mechanism for operating said clutch, said mechanism comprising a first rotatable member, connection between said first member and said clutch whereby the rotation of said first member operates said clutch, a second rotatable member, connection between said rotatable members whereby the rotation of said second member rotates said first member, and means controlled by the film for rotating said second member.

135. In a film handling apparatus, a feeding member, a feeding member clutch, and mechanism for operating said clutch, said mechanism comprising a first rotatable member, connection between said first member and said clutch whereby the rotation of said first member operates said clutch, a second rotatable member, connection between said rotatable members whereby the rotation of said second member rotates said first member, and means operable at predetermined times for rotating said second member.

136. In a film handling apparatus, a member for feeding a film, a continuously operating driving mechanism for said feeding member, a motor for operating said driving mechanism, a releasable connection between said feeding member and said continuously operating mechanism, resistance connectible in the circuit of said motor, means for connecting said resistance in the circuit of said motor, and control means operatively interconnecting said resistance connecting means and said releasable connection.

137. In a film handling apparatus, a member for feeding a film, driving mechanism for said feeding member, operable means for operatively connecting said member and said driving mechanism, means operable for temporarily reducing the speed of said driving mechanism, and sequential control means interconnecting said speed reducing means and said connecting means for operating said speed reducing means before the operation of said connecting means.

138. In a film handling apparatus including a plurality of operable parts, an intermittent feeding member, a shutter operatively connected to said intermittent member for cooperative movement therewith, means for disconnecting said intermittent member and said shutter from the remainder of the operable parts of the apparatus, means for stopping said intermittent member and said shutter in predetermined relation to the optical axis of said apparatus after they have been disconnected, and control mechanism actuated by the film for operating said stopping means.

139. In a film handling apparatus including a plurality of operable parts, an intermittent feeding member, a shutter operatively connected to said intermittent member for cooperative and timed movement therewith, positively controlled means for disconnecting said intermittent member and said shutter as a unit from the remainder of the operable parts of said apparatus, and means for stopping said intermittent member and said shutter after they have been disconnected independently of said other operable parts, whereby said shutter and said intermittent member are maintained in connection with each other so that the timing therebetween is not destroyed and the apparatus freed from the strain which would otherwise follow the sudden stopping of all of the operable parts of the apparatus.

140. In a film handling apparatus, a member for feeding a film intermittently, a member for taking up the film as it is fed by said intermittent member, a shutter operatively interconnected with said intermittent feeding member for cooperative and timed movement therewith, means for driving said intermittent member, shutter and said taking up member, positively controlled means for disconnecting said shutter and said intermittent member from said driving means while leaving said taking up member with the mass of film supported thereby operatively attached to said driving means, and means for predeterminedly stopping said shutter and said intermittent member after they have been disconnected from said driving means whereby said parts are freed from the strain which would follow the sudden stopping of the take-up member while connected thereto and the mass of film supported thereupon.

141. In a film handling apparatus, intermittent feeding means, a member for taking up a film as it is fed through the apparatus by said feeding means, a shutter connected to said feeding means for cooperative movement therewith, mechanism for driving said feeding means, said shutter, and said taking up member, a first operable means for disconnecting said shutter and said feeding means from said driving mechanism, a second separate operable means for disconnecting said taking up member from said driving mechanism, means for operating said first disconnecting means, and means for thereafter stopping said shutter and said feeding means predeterminedly, said stopping means thereby operating without being required to overcome any momentum transmitted from said taking up member.

142. In a film handling apparatus, means for feeding a film intermittently, a member for taking up the film, a shutter connected to said feeding means for cooperative movement therewith, a source of power, mechanism for disconnecting said feeding means, said shutter and said taking up means from said power, said mechanism including a clutch operable for disconnecting said shutter and said feeding means from said power, a separate clutch operable for disconnecting said taking up member from said power, and means cooperating with said shutter and said feeding means for stopping said shutter and said feeding means in predetermined relation to the optical axis of said apparatus after the disconnection of said clutches.

143. In a film handling apparatus, means for feeding a film intermittently, a member for taking up the film, a shutter connected to said feeding means for cooperative movement therewith, a source of power, mechanism for disconnecting said feeding means, said shutter and said taking up means from said power, said mechanism including a clutch operable for disconnecting said shutter and said feeding means from said power, a separate clutch operable for disconnecting said taking up member from said power, operable means cooperating with said shutter and said feeding means for stopping said shutter in predetermined relation to the optical axis of said apparatus after the disconnection of said clutches, and control mechanism operatively interconnecting said clutches and said means for predeterminedly stopping said shutter and said feeding means and effective for operating said clutches and said means.

144. In a film handling apparatus including a plurality of operable parts, an intermittent feeding member, a shutter operatively connected to said intermittent member for cooperative and timed movement therewith, means for positively disconnecting said intermittent member and said shutter from the remainder of the operable parts of the apparatus whereby they are freed from momentum thereof, and means controlled by the film for operating said disconnecting means.

145. In a film handling apparatus including a plurality of operable parts, an intermittent feeding member, a shutter operatively connected to said intermittent member for cooperative and timed movement therewith, control means for positively disconnecting said intermittent member and said shutter from the remainder of the operable parts of the apparatus whereby they are freed from the momentum thereof and thereafter for reconnecting said intermittent member and said shutter to said other operable parts, and means actuated by the film for operating said control means at predetermined intervals.

146. In a film handling apparatus, an apertured gate, a moving shutter for cooperating with the aperture of said gate, mechanism for driving said shutter, means for disconnecting said shutter from said driving mechanism, means for reconnecting said shutter and said driving mechanism, means for moving the film past said aperture while the shutter is disconnected, and means actuated by the film as so moved past said aperture for operating said reconnecting means.

147. In a film handling apparatus, a light source for cooperating with a film, means to protect the film from the heat of said light source, film feeding means, and film controlled means operated at predetermined time intervals to render said feeding means successively operative and inoperative and to render said protective means operative when the feeding means is inoperative.

148. In a film handling apparatus, a light source, means to protect a film from the heat of said light source, film feeding means, and film controlled means operated at predetermined time intervals to render said feeding means successively operative and inoperative for predetermined periods and to render said protective means operative when the feeding means is inoperative.

149. In a film handling apparatus, mechanism for feeding a film in one direction, mechanism for feeding the film in the other direction, a source of light cooperating with the film, means for protecting the film from the heat from said light source, means for reducing the speed of operation of one of said feeding mechanisms preparatory to the operation of the other of said mechanisms, and control mechanism operatively connecting said protecting means and said reducing means effective for operating said protecting means and said reducing means.

150. In a film handling apparatus, means for feeding a film in one direction, means for feeding the film in the other direction, operable means, separate from said feeding means and cooperating therewith, for decreasing the rate of speed of one of said feeding means preparatory to the operation of the other of said feeding means, and means for rendering said feeding means alternately operable, a light source for cooperation with the film, means for protecting the film from the heat from said light source, and actuating mechanism interlocking said speed decreasing means, said means rendering said feeding means alternately operable, and said protecting means.

151. In a film handling apparatus, means for feeding a film, a light source cooperating with the film, means for protecting the film from the heat from said light source, mechanism interconnecting said feeding means and said protecting means for rendering said feeding means successively operative and inoperative and for rendering said protecting means operative while said feeding means is inoperative and said protective means inoperative while said feeding means is operative, and means controlled by the film for operating said mechanism at predetermined intervals.

152. In a film handling apparatus, an apertured film gate, a light source, a heat shield, and mechanism adapted to move said heat shield into and out of the path of light between said source and the aperture of said gate, said mechanism comprising a rotatable member upon which said shield is mounted and means to rotate said member, said means comprising a gear, a rack bar cooperating therewith, a solenoid for moving said bar whereby said gear is rotated, and a connection between said gear and said member for rotating said member at once upon rotation of said gear in one direction and for rotating said member only after an initial period of rotation of said gear upon the rotation of said gear in the opposite direction.

153. In a film handling apparatus, a source of light, means for feeding a film past said light source for projecting pictures therefrom, means operable for rewinding said film, means operable for protecting the film from the heat of said light source, film-controlled means for rendering said feeding means inoperative, mechanism interconnecting said film-controlled means and said heat protecting means for operating said heat protecting means when said feeding means becomes inoperative, and means for thereafter rendering said rewinding means operative and for maintaining said heat protecting means operative while the film is being rewound.

154. In a film handling apparatus, a source of light, means for feeding a film past said light source for projecting pictures therefrom, means operable for rewinding the film, means operable for protecting the film from the heat of said light source, film-controlled means for rendering said feeding means inoperative, mechanism interconnecting said film-controlled means and said heat protecting means for operating said heat protecting means when said feeding means becomes inoperative, means for thereafter rendering said rewinding means operative and maintaining said heat protecting means operative while the film is being rewound, film-controlled means for rendering said rewinding means inoperative and said feeding means operative again when the rewinding of the film has been completed, and means for rendering said heat protecting means inoperative when said feeding means becomes operative again.

155. In a film handling apparatus, a member for feeding a film, mechanism for driving said feeding member, means for reducing the speed of operation of said driving mechanism whereby the film is fed at reduced speed, a source for passing light to the film fed by said member, means for reducing the amount of light effective upon the film fed by said member, and control mechanism for operating said speed-reducing means and said light-reducing means whereby the light reaching the film while said film is being fed at reduced speed is lessened, said control mechanism comprising a movable actuating member and connections between said actuating member and both of said means for operating said speed-reducing means and said light-reducing means upon movement of said actuating member.

156. In a film handling apparatus, a member for feeding a film, mechanism for driving said feeding member, means for reducing the speed of operation of said driving mechanism whereby the film is fed at reduced speed, a source for passing light to the film fed by said member, means for reducing the amount of light effective upon the film fed by said member, and control mechanism for operating said speed-reducing means and said light-reducing means whereby the light reaching the film while said film is being fed at reduced speed is lessened, said control mechanism comprising a movable actuating member, connections between said actuating member and both of said means for operating said speed-reducing means and said light-reducing means upon movement of said actuating member, and means controlled by the film for moving said actuating member.

157. In a film handling apparatus, a member for feeding a film, mechanism for driving said feeding member, a motor for operating said mechanism, resistance connectible in the circuit of said motor, means for connecting said resistance and said circuit, a light source for cooperating with the film, means for protecting the film from the heat of said light source, and control mechanism interconnecting said resistance connecting means and said protective means for rendering the latter operative when said resistance is connected in the circuit of said motor.

158. Motion picture apparatus comprising a film supporting spindle, a clutch therefor, means for feeding a film in relation to said spindle, a light source for directing light upon the film supported by said spindle, means for decreasing the light from said source effective upon the film, control mechanism operatively interconnecting said clutch and said light decreasing means for rendering said light-decreasing means operative and moving said spindle clutch to operative position, and means controlled by the film for actuating said control mechanism.

159. In a film handling apparatus, a member for feeding a film, mechanism for driving said feeding member, a motor for operating said mechanism, resistance connectible in the circuit of said motor, a light source for cooperating with said film, means for protecting the film from the heat from said light source, actuable control mechanism interconnecting said resistance connecting means and said protective means for rendering the latter operative when said resistance is connected in the circuit of said motor, and means controlled by predetermined zones of the film for actuating said control means.

160. In a film handling apparatus having a member for supporting a roll film, a light source cooperating with the film, a support for the film, means for moving the film intermittently in one direction from said support whereby light from said source passing therethrough projects pictures in motion, means for moving the film in the opposite direction whereby it is rewound, a length of heat resisting material attaching the trailing end of the film to said support and being sufficiently long to come to rest in the path of light from said source at the conclusion of such projecting operation, mechanism for rendering said means for rewinding the film operative, and means cooperating with said length of material for actuating said mechanism.

161. In a film handling apparatus having a member for supporting a roll of film, a light source for cooperation with the film, means for moving the film intermittently in one direction whereby light from said light source passing therethrough projects pictures in motion, means for moving the film in the opposite direction whereby it is rewound, a length of heat resisting material at least a portion of which is adapted for conducting electricity attached to the trailing end of the film, electrically operable driving means, means actuated by said conducting portion of the film, said electrical means cooperating with said moving means to bring said heat resisting material at the conclusion of such projecting operation to rest in the path of said light source, and mechanism actuated by said conducting portion for rendering said means for rewinding the film operable after said film comes to rest.

162. In a film handling apparatus having a member for supporting a roll of film, a light source, means for moving a film one end of which is attached to said supporting member past said light source for cooperation therewith, a portion of heat resisting material attaching the trailing end of the film to said supporting member and being of sufficient length to come to rest in the path of light from said source at the conclusion of such film moving operation, mechanism for rendering said protecting means operative, a separate means for protecting the film from the heat from said light source, and means cooperating with said portion of material for actuating said mechanism, whereby said portion of heat resisting material during said period of rest of the film, is effective to actuate said other and separate protective means for operation in a succeeding cycle of the apparatus.

163. In a film handling apparatus having a member for supporting a roll of film, a light source, means for moving the film past said light source, means for protecting the film from the heat from said light source, a length of heat resisting material at least a portion of which is adapted for conducting electricity attached to the trailing end of the film, electrically operable means actuated by said portion of said material at the conclusion of said film moving operation, said electrical means cooperating with said moving means to bring said length of said heat resisting material to rest in the path of light from said source, and electrical mechanism actuated by said conducting film portion for rendering said protective means operative.

164. In a film handling apparatus having four operating positions, a manual control movable at will to any one of four operating positions, a locking means for said control member movable either to operative or inoperative position, and supplemental means for operating said control while said locking means is in inoperative position.

165. In a film handling apparatus having a plurality of operating positions, a manual control movable at will to any one of said operating positions, a locking means for said control member movable either to operative or inoperative position, and supplemental means for operating said control while said locking means is in inoperative position.

166. In a film handling apparatus, means for feeding a film intermittently past an aperture at a speed whereby each image upon the film is exposed at the aperture for a period less than that of the persistence of human vision whereby motion pictures are projected, means for taking up the film as it is fed, mechanism for driving said feeding means and said taking up means, mechanism including an electric circuit for disconnecting and connecting said mechanism and said feeding means and said taking up means, mechanism controlled by the film for closing said circuit and disconnecting said driving mechanism from both of said means, a time relay, and mechanism operated by the time relay for opening said circuit and connecting said mechanism to both of said means.

167. In a film handling apparatus, a continuously operating film supporting member, a member for intermittently moving the film supported by said continuous member, a first source of power for driving said intermittent member, means for compensating for the difference in character of movement of said continuous member and said intermittent member, operable control mechanism for rendering said compensating means ineffective upon the film, and a second source of power for operating said control means.

168. In a film handling apparatus, a continuously operating film supporting member, a member for intermittently moving the film supported by said continuous member, a first source of power for driving said intermittent member, means for compensating for the difference in character of movement of said continuous member and said intermittent member, said compensating means including a member movable between a threading position wherein it defines a relatively short path between said continuous member and said intermittent member and a projecting position wherein it defines a relatively long path therebetween, operable control mechanism for moving said path defining member from one of said positions to the other, and a second source of power for operating said control mechanism.

169. In a film handling apparatus, a continuously operating film supporting member, a member for intermittently moving the film supported by said continuous member, a first source of power for driving said intermittent member, means for compensating for the difference in character of movement of said members, operable control mechanism for rendering said compensating means ineffective upon the film, a second source of power for said mechanism, and means controlled by the film for applying said second source of power to said operable control mechanism whereby said mechanism is operated.

170. In a film handling apparatus, a continuously operating film supporting member, a member for intermittently moving the film supported by said continuous member, a first source of power for driving said intermittent member, means for compensating for the difference in character of movement of said members, said compensating means including a member movable between a threading position wherein it defines a relatively short path between said continuous member and said intermittent member and a projecting position wherein it defines a relatively long path therebetween, a second source of power for moving said path defining member from one of said positions to the other, and means controlled by the film for applying said second source of power to said moving means whereby said moving means moves said path defining member from one of said positions to the other thereof.

171. In a film handling apparatus, a continuously operating film supporting member, an intermittently operating member engaging the film supported by said continuous member for feeding it in relation thereto, a film controlling member disposed between said continuous member and said intermittent member and bodily movable between a first position, wherein it is disposed upon one side of the path through which the film is normally fed and wherein it is without operative effect upon the film, and a second position, wherein it is disposed upon the other side of such path, the movement of said film controlling member from said first to said second position being effective to lengthen the stretch of the film between said continuous member and said intermittent member, manual means for moving said film controlling member from one of said positions to the other, and means responsive to the film as it is moved through said apparatus for moving said film engaging member from said last mentioned position to said first mentioned position.

172. In a film handling apparatus, a first film-supporting member, a second film-supporting member, a film-contacting member movable between a first position wherein it defines one side of a relatively short path for a film between said supporting members and a second position wherein it defines one side of a relatively long path, operable control mechanism for moving said path defining member between said first position and said second position, and means for moving the film from one of said supporting members to the other through said short path while said path defining member is maintained in said first position, said operable control mechanism including manual means for moving said path defining member to said first position and means actuated by the film as it is moved through said short path for moving said path defining member from said first position to said second position.

173. In a film handling apparatus, an openable gate, said gate including a fixed section and a section movable relatively thereto between a first position wherein said movable section is positioned adjacent said fixed section whereby said gate is closed and a second position wherein said movable section is positioned relatively distantly from said fixed section whereby said gate is opened, a support for a film, means for moving the film between said support and said gate and through said gate between the sections thereof, a film engaging member disposed between said gate and said support and movable between a first position wherein it defines one side of a relatively long path between said support and said gate and a second position wherein it defines one side of a relatively short path therebetween, control means interconnecting said movable gate section and said film engaging member and effective for moving said gate section between said positions therefor and for moving said film engaging member between said positions therefor, manual means for operating said control means for moving said gate section in one direction between said positions therefor and for moving said film engaging member in one direction between said positions therefor, and means actuated by the moving film for operating said control means to move said gate section in the other direction between said positions therefor and for moving said film engaging member in the other direction between said positions therefor.

174. In a film handling apparatus, an openable gate through which a film is fed, means for moving the film through said gate, a support for the film, means for guiding and controlling the tension of that section of the film extending between said support and said gate, said guiding and tension-controlling means including a film engaging member movable from one position relatively adjacent said gate wherein while said gate is open it forms one side of a path in which the film is initially positioned to another position wherein it forms one side of the path through which the film is moved while said gate is closed, means for opening said gate, means for moving said film engaging member from one of said positions to the other, and means actuated by the moving film for moving said film engaging member from the second above mentioned position back to the first above mentioned position.

175. In a film handling apparatus, a gate, said gate comprising a fixed section and a section movable between a first position wherein it is disposed relatively adjacent to said fixed section and a second position wherein it is disposed relatively remotely thereto, means for feeding a film between said sections, and control mechanism for moving said movable section from one of said positions to the other, said control mechanism comprising a source of power, means for applying said source of power to said movable gate section whereby said gate section is moved from one of said positions to the other thereof, and means governing and retarding the speed of operation of said powered means whereby the movement of said movable section is retarded and controlled.

176. In a film handling apparatus, a film having a modified portion, a member for feeding said film, means for causing relative movement between said film and said feeding member whereby said film is removed therefrom, and means responsive to said modified portion for operating said means for causing relative movement between said film and said feeding member.

177. In a film handling apparatus including a plurality of operable parts, an intermittent feeding member, a shutter operatively connected to said intermittent member for cooperative and timed movement therewith, positively controlled means for disconnecting said intermittent member and said shutter as a unit from the remainder of the operable parts of said apparatus, means for driving said intermittent member and said shutter and said other operable parts of said apparatus, means for stopping said intermittent member and said shutter after they have been disconnected independently of said other operable parts, and means operable for applying a retarding force to said driving means in timed relation to such disconnection.

178. In a film handling apparatus, a member for feeding a film intermittently, a member for taking up the film as it is fed by said intermittent member, a shutter operatively connected to said intermittent member for cooperative and timed movement therewith, mechanism for driving said intermittent member, said shutter and said taking up member, means for disconnecting said intermittent member and said shutter from said driving mechanism while leaving said taking up member operatively attached thereto, means for predeterminedly stopping said shutter and said feeding member after they have been disconnected from said driving mechanism, means for applying a retarding force to said driving mechanism, and means connecting said shutter stopping means and said retarding means for concomitantly operating both of said means.

WARREN DUNHAM FOSTER.